United States Patent
Gomi et al.

(10) Patent No.: US 8,513,917 B2
(45) Date of Patent: Aug. 20, 2013

(54) RECHARGING SYSTEM FOR A RECHARGEABLE BATTERY OF AN INVERTED PENDULUM TYPE VEHICLE

(75) Inventors: Hiroshi Gomi, Wako (JP); Kazushi Hamaya, Wako (JP); Kazushi Akimoto, Wako (JP); Yuichi Uebayashi, Wako (JP); Shinichiro Kobashi, Wako (JP); Hironori Waita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 12/884,724

(22) Filed: Sep. 17, 2010

(65) Prior Publication Data

US 2011/0068738 A1 Mar. 24, 2011

(30) Foreign Application Priority Data

Sep. 18, 2009 (JP) ................................. 2009-217824
Dec. 1, 2009 (JP) ................................. 2009-273363

(51) Int. Cl.
*H02J 7/00* (2006.01)
(52) U.S. Cl.
USPC ............................ 320/109; 320/115; 180/121
(58) Field of Classification Search
USPC .......................... 320/109, 110, 111, 115, 108
See application file for complete search history.

(56) References Cited

U.S. PATENT DOCUMENTS

| | | | |
|---|---|---|---|
| 1,654,862 A * | 1/1928 | Clyne | ........................... 280/302 |
| 3,399,742 A | 9/1968 | Malick | |
| 5,701,965 A | 12/1997 | Kamen et al. | |
| 5,791,425 A | 8/1998 | Kamen et al. | |
| 6,150,794 A * | 11/2000 | Yamada et al. | ............... 320/108 |
| 7,337,862 B1 | 3/2008 | Greenley et al. | |
| 7,424,927 B2 | 9/2008 | Hiramatsu | |
| 7,823,676 B2 | 11/2010 | Yamada et al. | |
| 7,866,429 B2 | 1/2011 | Ishii et al. | |
| 7,963,352 B2 | 6/2011 | Alexander | |
| 8,011,459 B2 | 9/2011 | Serai et al. | |

(Continued)

FOREIGN PATENT DOCUMENTS

JP 2003-79006 A 3/2003
JP 2006074868 3/2006

(Continued)

OTHER PUBLICATIONS

Non-Final Office Action; dated May 31, 2012, Issued on related U.S. Appl. No. 12/884,748.

(Continued)

*Primary Examiner* — Samuel Berhanu
(74) *Attorney, Agent, or Firm* — Squire Sanders (US) LLP

(57) ABSTRACT

A recharging system for a rechargeable battery (281) of an inverted pendulum type vehicle (1) comprises a stand (86) for holding the vehicle in a substantially upright posture by using a supporting member (91, 96) that engages a prescribed part of the vehicle, a power feed device (95, 152) is provided on the stand, and a power take device (88, 151) provided on the vehicle. The power take device is positioned so as to couple with the power feed device when the prescribed part of the vehicle is engaged by the supporting member of the stand. The stand allows the vehicle to be placed in an upright posture simply leaning the vehicle against a part of the supporting member, and the electric connection between the rechargeable battery of the vehicle and the power source can be established at the same time without requiring any extra effort.

11 Claims, 26 Drawing Sheets

(56) References Cited

U.S. PATENT DOCUMENTS

| | | |
|---|---|---|
| 8,016,060 B2 | 9/2011 | Miki et al. |
| 8,050,837 B2 | 11/2011 | Yamada |
| 8,155,828 B2 | 4/2012 | Fuwa et al. |
| 2001/0000394 A1* | 4/2001 | Whittaker .................... 180/220 |
| 2008/0147281 A1 | 6/2008 | Ishii et al. |
| 2008/0284375 A1 | 11/2008 | Nagaoka et al. |
| 2009/0266629 A1 | 10/2009 | Simeray et al. |
| 2009/0288900 A1 | 11/2009 | Takenaka et al. |
| 2010/0023220 A1 | 1/2010 | Nakashima et al. |
| 2010/0063719 A1 | 3/2010 | Doi |
| 2011/0067937 A1 | 3/2011 | Gomi et al. |

FOREIGN PATENT DOCUMENTS

| | | |
|---|---|---|
| JP | 2006282160 | 10/2006 |
| JP | 2009-106138 | 5/2009 |
| WO | 2008/132779 | 11/2008 |

OTHER PUBLICATIONS

Hiroshi Gomi, U.S. Appl. No. 12/884,748, filed Sep. 17, 2010.

Hiroshi Gomi, U.S. Appl. No. 12/884,738, filed Sep. 17, 2010.

Japanese Office Action application No. 2009-273363 dated Jun. 14, 2012.

Hiroshi Gomi et al., U.S. Patent Application titled "Inverted Pendulum Type Vehicle", Filing Date: Sep. 17, 2010, specification and drawings, a total of 44 pages.

Hiroshi Gomi et al., U.S. Patent Application titled "Frictional Drive Device and Inverted Pendulum Type Vehicle Using the Same", Filing Date: Sep. 17, 2010, specification and drawings, a total of 51 pages.

Office Action dated Apr. 25, 2013 for corresponding U.S. Appl. No. 12/884,748.

* cited by examiner

Fig.11a
Fig.11b
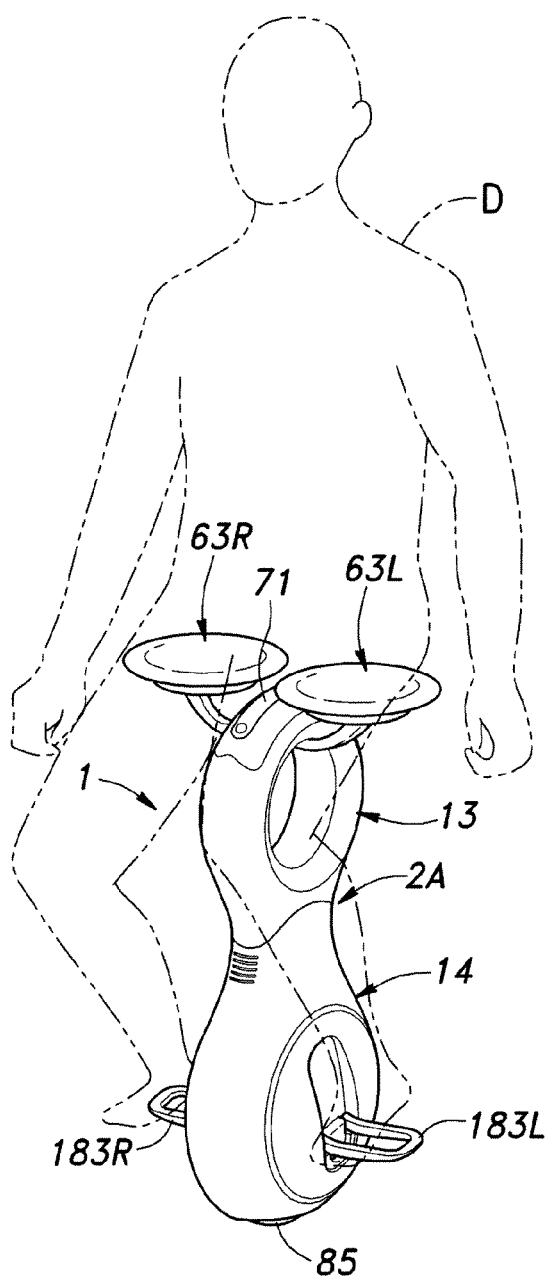
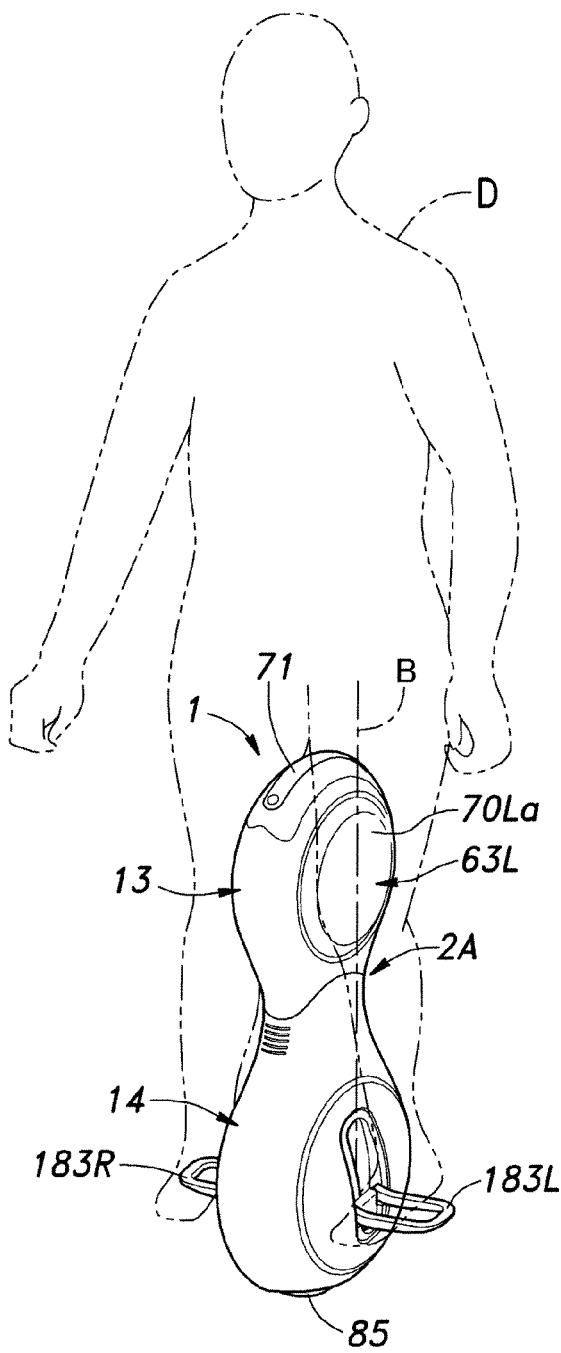

RECHARGING SYSTEM FOR A RECHARGEABLE BATTERY OF AN INVERTED PENDULUM TYPE VEHICLE

TECHNICAL FIELD

The present invention relates to a recharging system for a rechargeable battery of an inverted pendulum type vehicle.

BACKGROUND OF THE INVENTION

Known is an inverted pendulum type vehicle or an omni-directional vehicle comprising a pair of drive assemblies individually actuated by electric motors and a main wheel held between the drive assemblies and frictionally driven by the drive assemblies. See WO2008132779A1 (US20100096905A1) (patent document 1) for instance. Each drive assembly comprises a drive disk coaxially opposing the drive disk of the other drive assembly and a plurality of drive rollers obliquely arranged along the circumference of the drive disk at a regular interval so as to be individually rotatable. The main wheel comprises a ring-shaped annular member rotatably supported by a frame around a central axial line thereof and a plurality of driven rollers arranged along the circumference of the annular member so as to be rotatable around the respective tangential lines. As the drive disks are turned by the electric motors, the driven rollers are frictionally driven by the drive rollers. When the drive rollers are turned around the tangential directions of the main wheel, the vehicle is driven in a lateral direction. When the main wheel is turned around the central axial line thereof, the vehicle is driven in a fore and aft direction. The direction of motion of the vehicle can be selected as desired by suitably adjusting the difference between the rotational speeds of the two drive disks.

The vehicle of this type is typically powered by a rechargeable battery carried by the vehicle, and this necessitates the recharging of the battery from time to time. It is conceivable to use battery recharging systems developed for more conventional electric vehicles. According to a previous proposal of this kind, a primary coil connected to a power source is buried in the ground of a parking space, and electric current is induced in a secondary coil provided on the vehicle so as to oppose the primary coil when the vehicle is parked in the parking space. Thereby, the electric power from the power source can be transmitted to the rechargeable battery of the vehicle without requiring any physical contact. See Japanese patent laid open publication No. 2006-74868 (patent document 2), for instance.

However, as an inverted pendulum type vehicle is unable to maintain an upright posture when powered off or otherwise rendered inoperative, a stand is required to maintain the vehicle in an upright posture while recharging the rechargeable battery of the vehicle, and this prevents the use of conventional recharging systems for an inverted pendulum type vehicle. In particular, be it a contactless recharging system using electromagnetic induction or a contact recharging system using connectors, the coils and connectors have be to placed in appropriate parts of the stand and vehicle so that the recharging of the battery may be effected in an efficient and convenient manner.

An inverted pendulum type vehicle is typically advantageous in the ability to make tight turns, and freely move about in limited spaces. To enhance this advantageous, it is desirable to minimize the foot print (area of the profile of the vehicle projected on the floor) of the vehicle.

The lower part of the vehicle that comprises a main wheel of a relatively small width and a drive unit for actuating the main wheel can be given with a compact profile having a relatively elongated fore and aft dimension and a relatively small lateral width. To minimize the foot print of the vehicle, it is desirable to have the profile of the upper part of the vehicle to be substantially conformal to the profile of the lower part in terms of a horizontal section.

BRIEF SUMMARY OF THE INVENTION

In view of such problems of the prior art, a primary object of the present invention is to provide a recharging system for a rechargeable battery of an inverted pendulum type vehicle which allows the vehicle to be supported in a prescribed posture so that the electric connection between a stand for supporting the vehicle and the battery of the vehicle may be established without requiring any effort on the part of the user.

According to the present invention, such an object can be accomplished by providing a recharging system for a rechargeable battery of an inverted pendulum type vehicle, comprising: a stand for holding the vehicle in a substantially upright posture by using a supporting member that engages a prescribed part of the vehicle; a power feed device provided on the stand and connected to a power source; and a power take device provided on the vehicle and configured to electrically couple with the power feed device to feed electric power from the power source to the rechargeable battery; wherein the power take device is positioned so as to receive electric power from the power feed device when the vehicle is put into a prescribed positional relationship to the supporting member of the stand.

The stand allows the vehicle to be placed in an upright posture simply, for instance, by leaning the vehicle against a part of the supporting member, and the electric coupling or connection between the rechargeable battery of the vehicle and the power source can be established at the same time without requiring any extra effort.

The inverted pendulum type vehicle may include a narrow section in a vertically intermediate part thereof, and the supporting member comprises a pair of arm members configured to interpose the narrow section therebetween. According to this arrangement, the narrow section can be snugly received between the arm members, and this ensures a stable support of the vehicle and a reliable electric connection at the same time. It is particularly preferable if the stand comprises a mechanism for selectively moving the arm members toward and away from each other. Thereby, the tolerance of the initial position of the vehicle with respect to the stand for stable support of the vehicle and reliable electric coupling can be maximized, and the vehicle can be supported more firmly.

According to a preferred embodiment of the present invention, the inverted pendulum type vehicle is generally more elongated in a fore and aft direction than in a lateral direction, and the narrow section is narrowed in the fore and aft direction. If the support member further comprises a front wall for leaning a fore and aft end of the narrow section against thereto while the arm members interpose the narrow section from either lateral side of the vehicle therebetween, the vehicle can be held in a particularly stable manner, and the power take device can be coupled with the power feed device in a particularly reliable manner. Alternatively, the support member may further comprise a front wall for leaning a lateral side of the narrow section against thereto while the arm members interpose the narrow section from either fore and aft end of the vehicle therebetween. This also ensures a stable support of the vehicle and a reliable electric connection at the same time.

If the power feed device comprises a primary coil for generating a AC magnetic field, and the power take device comprises a secondary coil for inducing AC electric current from the generated AC magnetic field when the prescribed part of the vehicle is engaged by the supporting member of the stand, the electric coupling between the stand and vehicle can be effected without requiring physical contact.

If the power feed device comprises a first electric connector, and the power take device comprises a second electric connector which is configured to establish an electric connection with the first electric connector when the prescribed part of the vehicle is engaged by the supporting member of the stand, the electric coupling between the stand and vehicle can be effected in an electrically efficient and reliable manner. In the latter case, the required electric contacts may be provided on one of the arm members or both of the arm members.

According to a preferred embodiment of the present invention, the vehicle comprises a frame including an upper frame and a lower frame that are separated from each other by the narrow section, and the upper frame defines a hollow interior receiving the rechargeable battery therein while the lower frame is incorporated with a drive unit that is powered by the rechargeable batter and propels the vehicle. In particular, the narrow section defines a hollow interior receiving an electric unit for controlling supply of electric power from the rechargeable batter to the drive unit. In this case, the power take device can be located adjacent to the electric unit, and this minimizes the required amount of power wiring and minimizes the power loss. Also, this arrangement contributes to the compact design of the vehicle, in particular to the minimization of the foot print of the vehicle.

BRIEF DESCRIPTION OF THE DRAWINGS

Now the present invention is described in the following with reference to the appended drawings, in which:

FIGS. 11*a* and 11*b* are perspective views of the inverted pendulum type vehicle in two different vehicle occupant situations, with the seat assembly deployed for a vehicle occupant to sit thereon and with the seat assembly retracted so that the vehicle occupant may ride the vehicle in a standing posture, respectively;

DETAILED DESCRIPTION OF THE PREFERRED EMBODIMENTS

Figure 1:
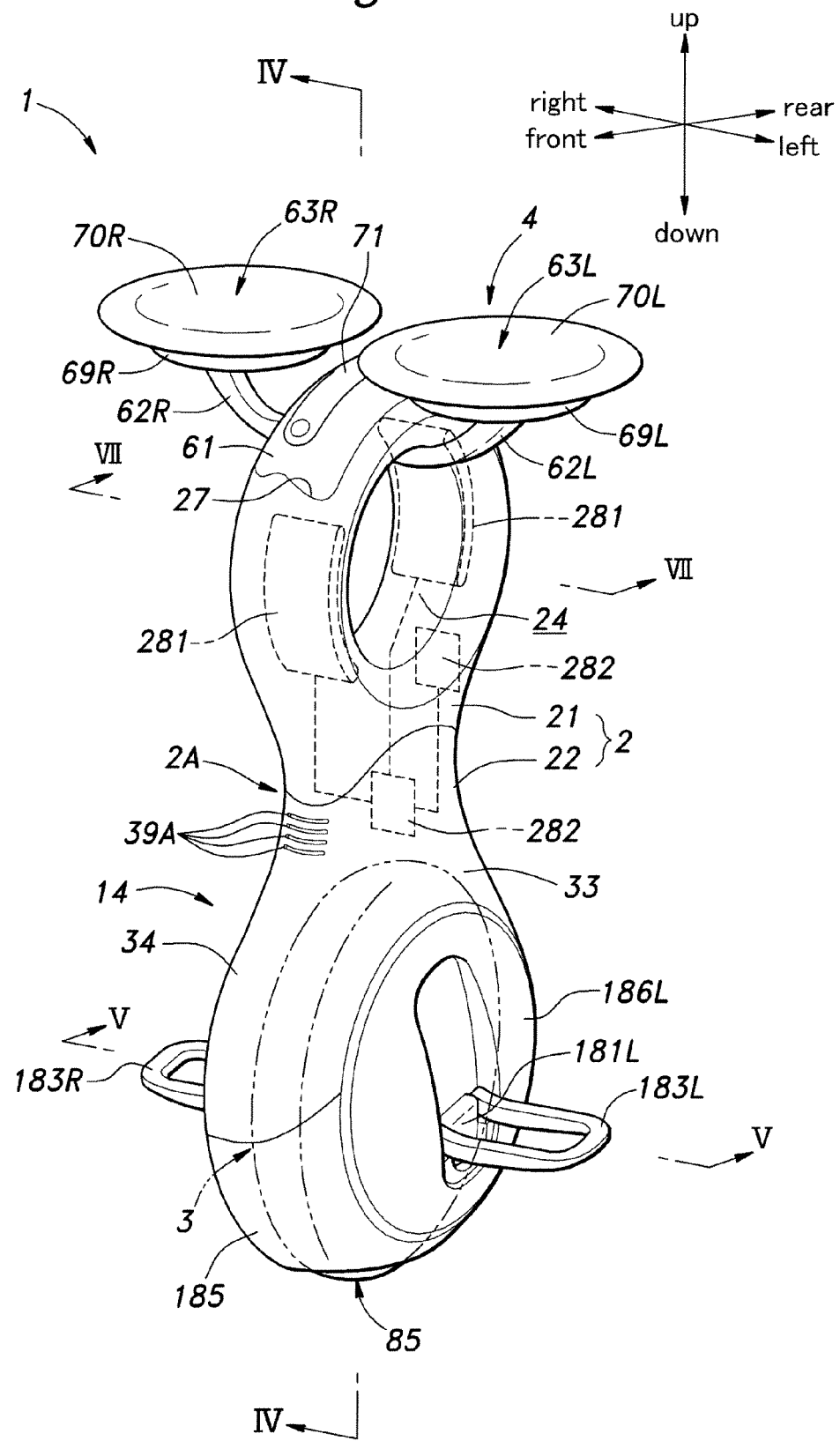
FIG. 1 is a perspective view of an inverted pendulum type vehicle embodying the present invention with a seat assembly deployed for a vehicle occupant to sit thereon and steps deployed for the feet of the vehicle occupant to rest thereon.

The vehicle according to the present invention is in large part symmetric with respect to a central longitudinal plane, and various components are used in pairs, one on the right hand side and the other on the left hand side. Such components are denoted with numerals with a suffix L or R, L indicating the component being on the left hand side and R indicating the component being on the right hand side. Therefore, only one of each of such pairs may be described in the following by denoting the component with a numeral without a suffix, instead of repeating the same description with respect to the other of the pair. These numerals are also used without the suffix in the following description to denote such components collectively.

Referring to FIGS. 1, 3, 4 and 5, the inverted pendulum type vehicle 1 given as a first embodiment of the present invention comprises a frame 2 elongated in a vertical direction, a drive unit 3 incorporated in a lower part of the frame 2, a seat assembly 4 incorporated in an upper part of the frame 2, an electric unit 11 received in an inner middle part of the frame 2 and a battery unit 10 received in an upper part of the frame 2 to power the drive unit 3 and electric unit 11 as well as various sensors. The electric unit 11 comprises an inverted pendulum control unit 5, an upper load sensor 6 and an inclination sensor 7. The control unit 5 controls the drive unit 3 according to the principle of the inverted pendulum control based on output signals received from various sensors so as to maintain the vehicle 1 in an upright posture. The sensors include a pair of step load sensors 8 and rotary encoders 9.

Referring to FIG. 1, the frame 2 is formed as a hollow shell, and have a substantially greater fore and aft dimension than a lateral dimension as seen in a horizontal cross section. The frame 2 includes a narrow section 2A which is narrow as seen from a side, or has a side profile in the shape of numeral "8". The frame 2 is divided into an upper frame 21 and a lower frame 22 at the narrow section 2A as best illustrated in FIG. 4.

Each of the upper and lower frames 21 and 22 is made of dry carbon (carbon fiber reinforced plastic material) which is formed by thermally curing carbon pre-impregnated sheets. The upper frame 21 and lower frame 22 are joined to each other via the upper load sensor 6 which will be described hereinafter.

Figure 3:
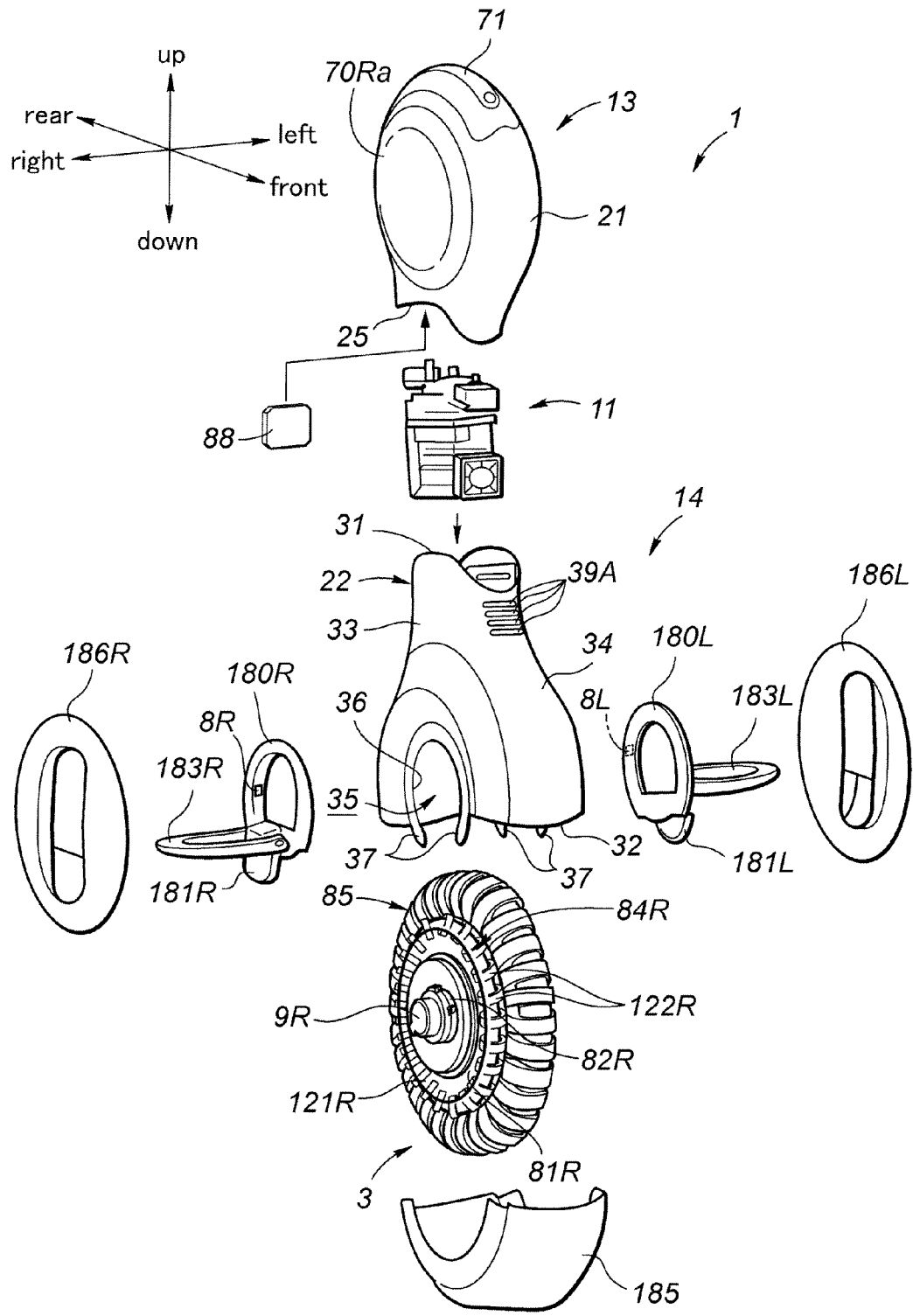
FIG. 3 is an exploded perspective view of the vehicle.
Figure 4:
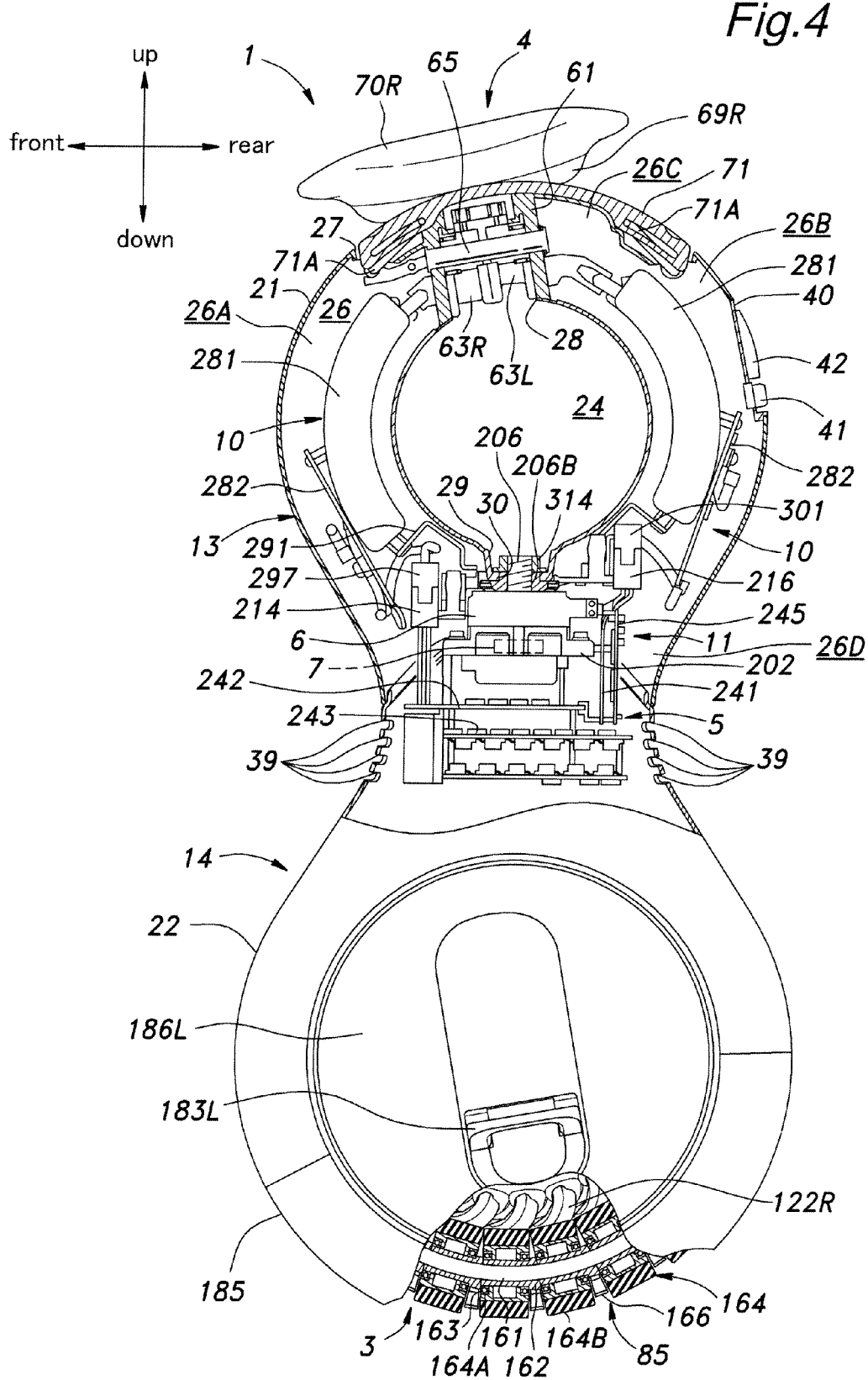
FIG. 4 is a sectional view taken along line IV-IV of FIG. 1.

As shown in FIG. 4, the upper frame 21 is given with an annular shape so as to define a central space or a saddle storage space 24 passed laterally across the upper frame 21. The hollow interior of the upper frame 21 includes a front space 26A, a rear space 26B, an upper space 26C, and a lower space 26D. The lower end of the upper frame 21 is formed with a lower opening 25 (FIG. 3) facing downward. The upper end of the upper frame 21 is formed with an upper opening 27 communicating the upper space 26C with the exterior of the upper frame 21. The wall of the upper frame 21 separating the upper space 26C from the saddle storage space 24 is formed with a saddle mounting hole 28. The wall of the upper frame 21 separating the lower space 26D from the saddle storage space 24 is formed with a recess 29 which is recessed downward, and a connecting hole 30 is formed centrally in the bottom wall of the recess 29.

The upper frame 21 thus defines an annular interior. The seat assembly 4 is received in the saddle storage space 24 passed laterally across the upper frame 21. Therefore, the annular shape of the upper frame 21 is conveniently utilized for storing the seat assembly 4 and battery unit 10 in a highly compact manner.

As shown in FIG. 4, to a rear side of the upper frame 21 is secured a switch panel 40 which includes a power switch 41 to turn on and off the main power of the vehicle 1 and a power lamp 42 that lights up when the main power is turned on.

Figure 6:
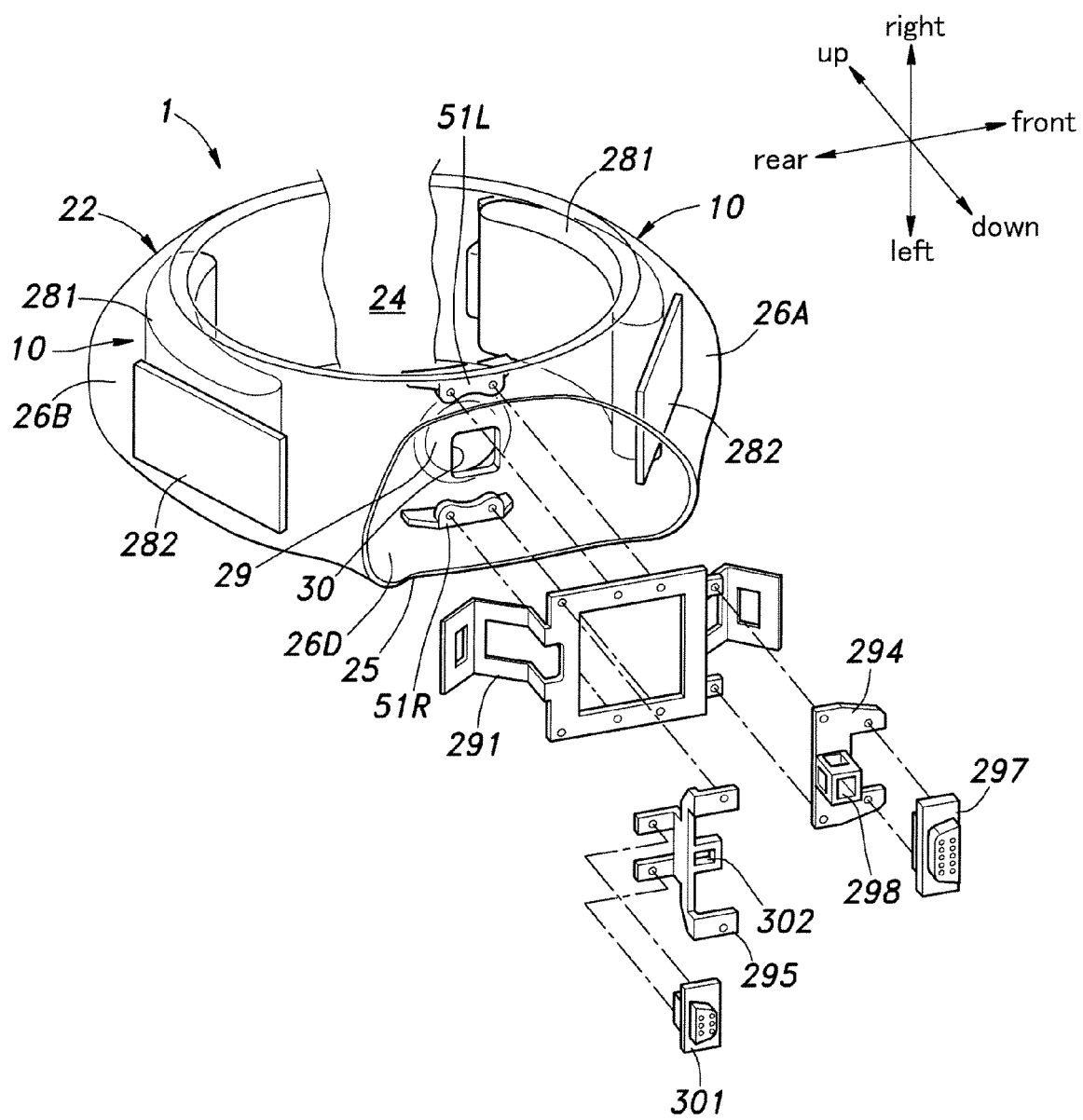
FIG. 6 is a partly broken away exploded perspective view of an upper structure of the vehicle.

As shown in FIG. 6, to the inner surface of the upper wall of the lower inner space 26D are attached a pair of metallic support bases 51 on either lateral side of the recess 29. Each support base 51 is provided with a horizontal plate section extending in the fore and aft direction, and a pair of threaded holes are formed vertically in the horizontal plate section one behind the other.

As shown in FIG. 3, the lower frame 22 is also made of a hollow shell having an upper opening 31 and a lower opening 32. The lower frame 22 includes a pair of side walls 33 extending vertically in mutually parallel relationship, and is generally elongated in the fore and aft direction. The front and rear walls 34 bulge in forward and rearward directions, respectively, adjacent to lower parts thereof so that a lower part of the lower frame 22 presents a substantially semi-circular side profile. The lower part of the lower frame 22 defines a receiving space 35 for receiving an upper half of the drive unit 3.

The lower edge of each side wall 33 of the upper frame is provided with a semi-circular cutout 36 substantially concentric to the semi-circular side profile of the lower frame 22. The semi-circular cutouts 36 of the two side walls 33 are conformal and coaxial to each other. Each semi-circular cutout 36 is flanked by a pair of tongue pieces 37 depending therefrom as seen in a side view. The upper part of each of the front and rear walls 34A and 34B, adjacent to the narrow section 2A of the frame 2, is formed with vent openings 39A and 39B which, in this case, consist of a plurality of laterally elongated holes arranged vertically in mutually parallel relationship.

In the vehicle 1 of the illustrated embodiment, because the drive unit 3 and battery unit 10 are arranged in the lower frame 22 and upper frame 21, respectively, the vehicle 1 may be given with a vertically slender configuration having a small foot print. Furthermore, because the electric unit 11 is placed between the drive unit 3 and battery unit 10 or in the narrow section 2A, the vehicle 1 is given with a highly compact profile.

Figure 8:
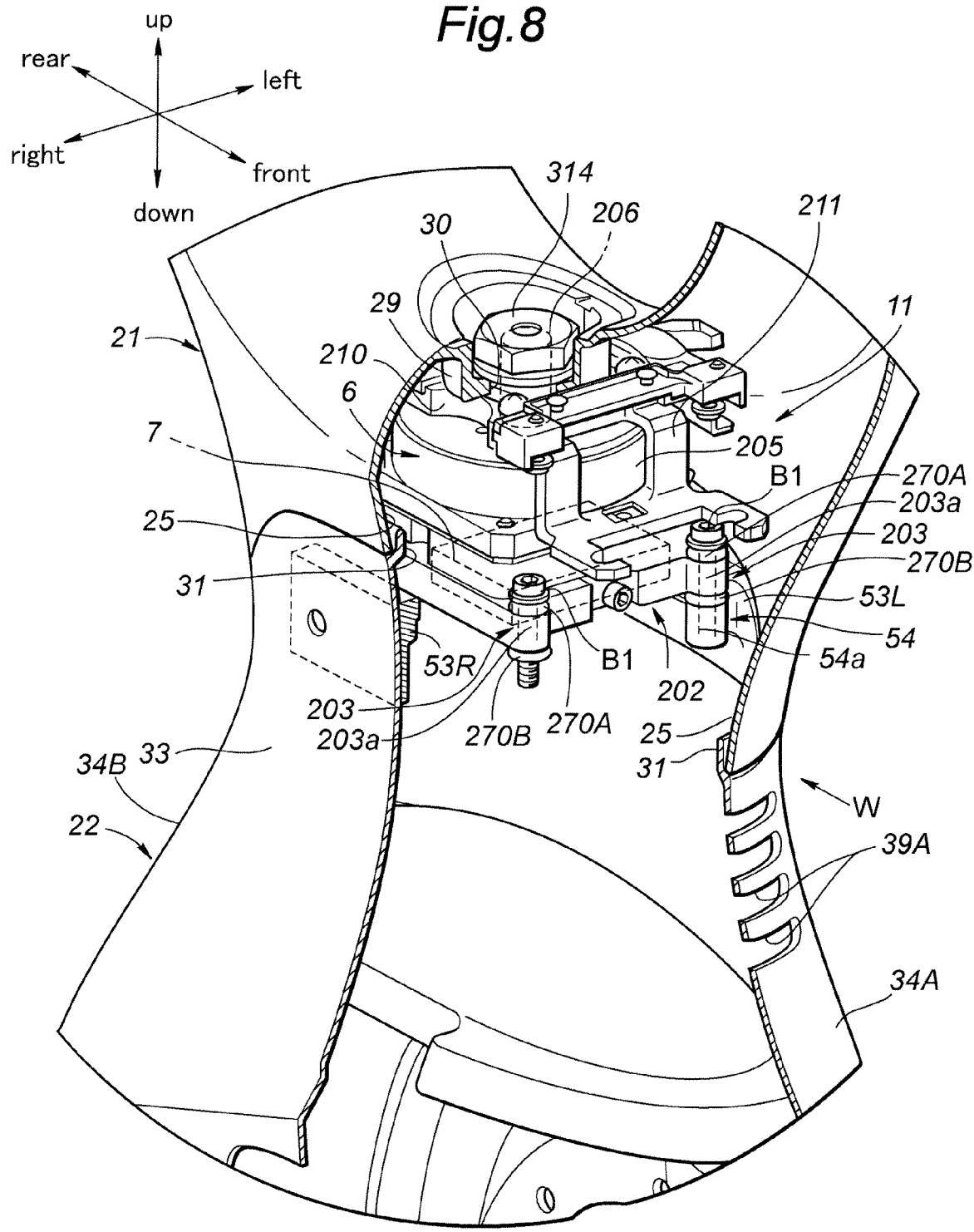
FIG. 8 is a partly broken away fragmentary perspective view of a narrow section of the vehicle.

Referring to FIG. 4, the upper frame 21 forms an upper structure 13 in cooperation with the seat assembly 4 and battery unit 10, and the lower frame 22 forms a lower structure 14 in cooperation with the drive unit 3, electric unit 11 and sensors 8 and 9 (FIGS. 3 and 8). The upper structure 13 can be separated from the lower structure 14 when necessary.

Figure 7:
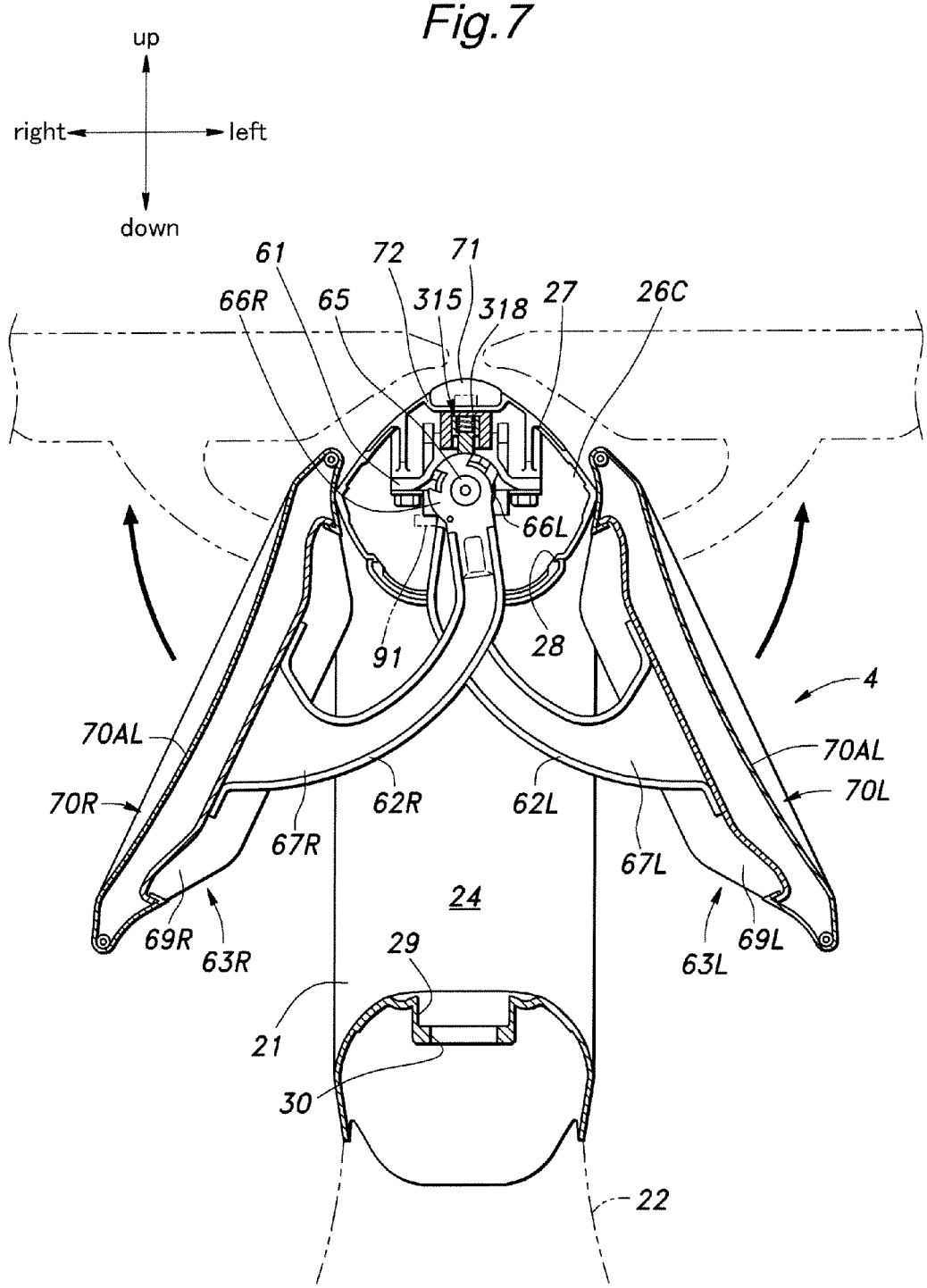
FIG. 7 is a sectional view taken along line VII-VII of FIG. 1.

Referring to FIG. 7, the seat assembly 4 includes a base main body 61, a pair of saddle arms 62 and a pair of saddle members 63. The base main body 61 is installed in the upper space 26C from the upper opening 27, and an upper wall of the base main body 61 closes the upper opening 27. A lower part of the base main body 61 is provided with a support shaft 65 extending in the fore and aft direction.

The support shaft 65 pivotally supports the base ends 66 of the saddle arms 62. Each saddle arm 62 extends from the base end 66 thereof, and is passed through the saddle mounting hole 28. The free end 67 of each saddle arm 62 is therefore located outside of the upper frame 21. The left saddle arm 62L is rotatable between a retracted position in which the free end 67L thereof is located below the base end 66L thereof or within the saddle storage space 24 and a deployed position (service position) located to the left of the base end 66L thereof. Similarly, the right saddle arm 62R is rotatable between a retracted position in which the free end 67R thereof is located below the base end 67R thereof or within the saddle storage space 24 and a deployed position (service position) located to the right of the base end 66R thereof. Each saddle arm 62 is curved so that the convex side thereof faces downward in the deployed position thereof.

The saddle arms 62 are connected to each other via a link mechanism not shown in the drawings so that one of them may be retracted when the other one is retracted, and deployed when the other one is deployed in unison in each case. The base main body 61 is provided with a lock member (not shown in the drawings) which is selectively engaged by an engagement hole provided in each of the saddle arms 62 so that the saddle arms 62 may be fixed at each of the retracted position and deployed position as required.

The free end 67 of each saddle arm 62 is fitted with a saddle member 63 that includes a support portion 69 by which the saddle member 63 is connected to the saddle arm 62 and a disk shaped cushion pad 70 supported by the support portion 69. Each cushion pad 70 defines a seat surface 70A, on a side thereof opposite from the support portion 69, for supporting a buttock of a vehicle occupant. When the saddle arms 62 are in the deployed position as indicated by the double-dot chain-dot line in FIG. 7, the cushion pad 70 is placed above the support portion 69, and defines an upwardly directed seat surface. The load of the vehicle occupant D in the sitting posture (see FIG. 11a) is applied to the upper frame 21 via the saddle member 63, saddle arm 62 and base main body 61.

When the saddle arms 62 are in the retracted position, the support portions 69 of the saddle members 63 are received within the saddle storage space 24 and the cushion pads 70 close the respective sides of the saddle storage space 24 so that the upper frame 21 presents a smooth side contour.

The structure of the seat assembly 4 for the vehicle 1 is not limited to the one used in the illustrated embodiment, but may also be given with different configurations, for instance for supporting a cargo. In such a case, the shape of the saddle member or members 63 may be modified to suit the particular cargo to be transported by the vehicle 1.

Figure 2:
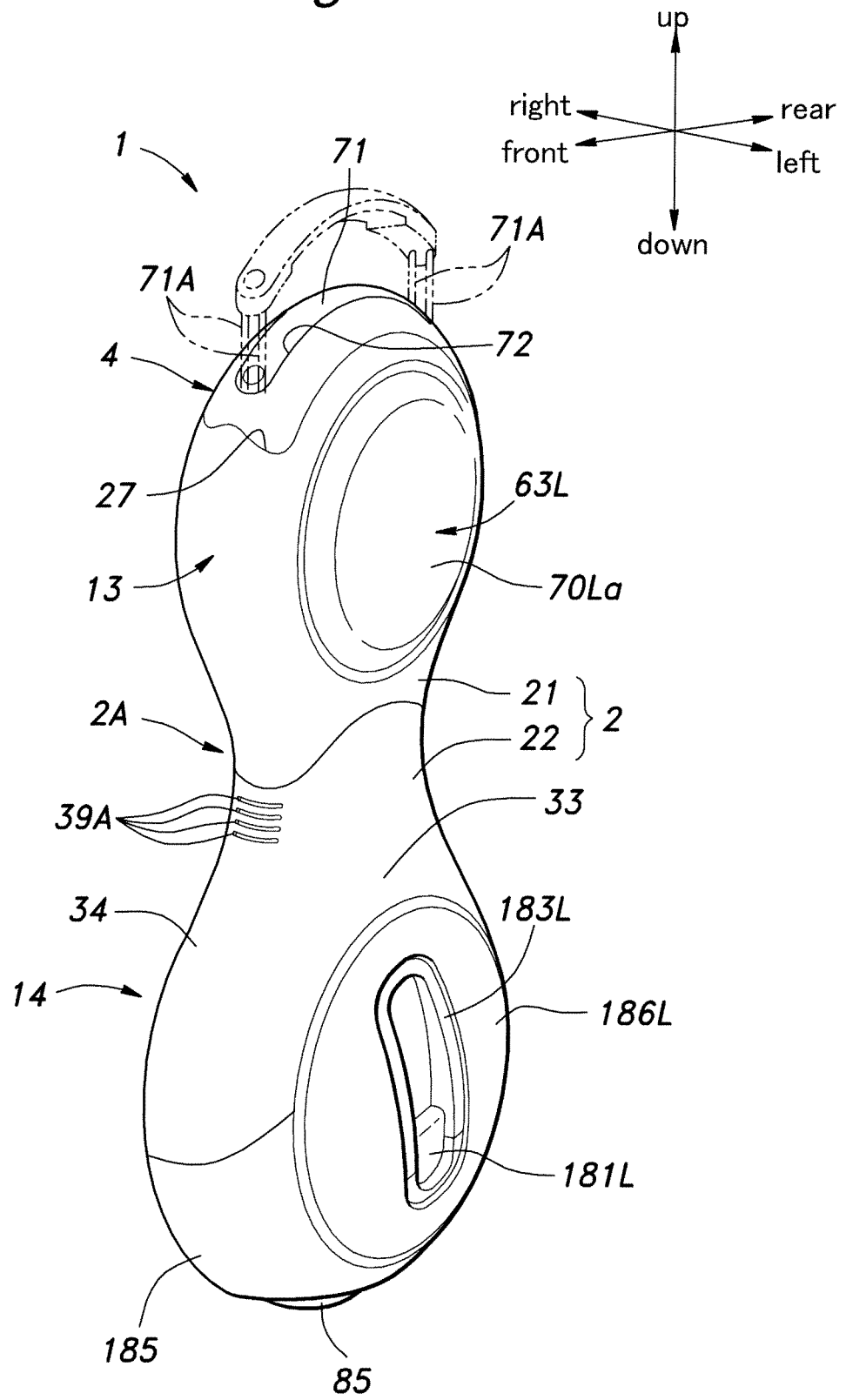
FIG. 2 is a view similar to FIG. 1 showing the vehicle ready to be transported with the seat assembly and steps retracted.

The upper wall of the base main body 61 is fitted with a retractable grip handle 71 that can be used for lifting and carrying the vehicle 1 by the user, much like a grip handle of a suitcase. When not in use, the grip handle 71 may be received in a handle receiving recess 72 formed in the upper wall of the base main body 61 as indicated by the solid lines in FIG. 2. When in use, the grip handle 71 is raised above the base main body 61, and connected to the base main body 61 via a pair of legs 71A as indicated by the imaginary lines in FIG. 2. Each leg 71A includes a base end pivotally connected to the base main body 61 and a free end pivotally connected to the grip handle 71 via a slot formed in the grip handle 71. Therefore, when the vehicle is powered off, the user can lift and carry the vehicle 1 or maintain the vehicle in the upright posture by holding the grip handle 71.

Figure 5:
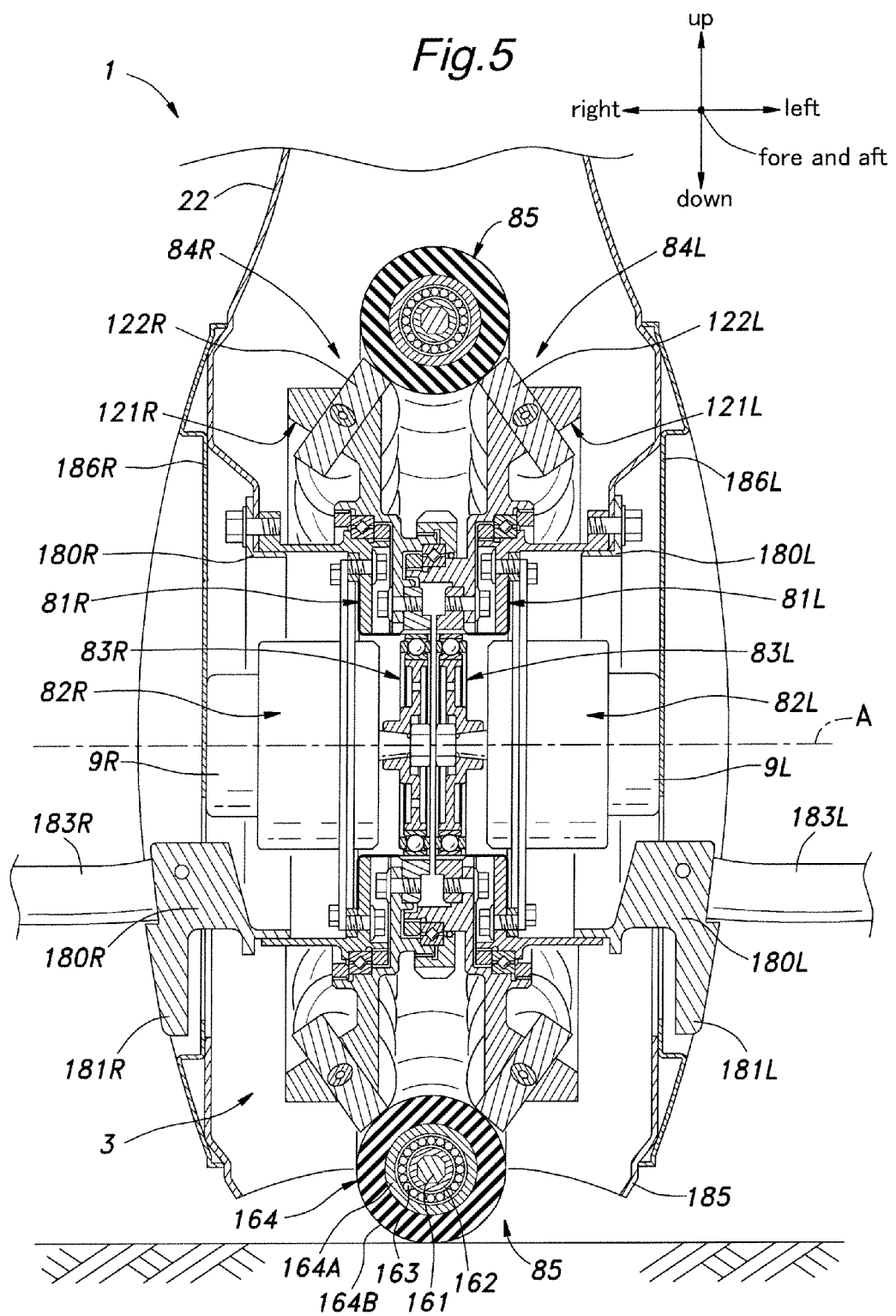
FIG. 5 is a sectional view taken along line V-V of FIG. 1.

As shown in FIGS. 3 to 5, the drive unit 3 comprises a pair of symmetrically opposing drive assemblies 84 each comprising a mount member 81 fixedly attached to the lower frame 22, an electric motor 82 mounted on the mount member 81, a wave gear device 83 for reducing the rotational speed of the output shaft of the motor 82, and a drive disk 121 rotatively actuated by the electric motor 82 via the wave gear device 83. Thus, the rotational output of the electric motor 82 is transmitted to the drive disk 121 at a reduced speed. The drive unit 3 further comprises a main wheel 85 interposed between the two drive assemblies 84, and rotatively actuated by the two drive assemblies 84.

As shown in FIG. 5, each mount member 81 consists of a cylindrical member having an axial line thereof directed laterally, and is provided with a radial internal flange on an inner axial end thereof and a radial external flange on an outer axial end thereof. The mount member 81 receives the corresponding electric motor 82 therein, and the output shaft thereof extends inwardly through a central opening of the radial internal flange. As the electric motor 82 is substantially coaxially received in the hollow interior of the cylindrical portion of the mount member 81, the drive unit 3 can be given with a highly compact and slim profile, and this in turn allows the lower frame 22 to have a highly compact outer profile.

As shown in FIG. 5, each drive assembly 84 further comprises a plurality of drive rollers 122 rotatably supported by the drive disk 121. The drive rollers 122 are arranged along the periphery of the corresponding drive disk 121 at a regular interval, and are rotatably supported by respective roller shafts such that the planes of rotation of the drive rollers 122 are each disposed neither in parallel to nor perpendicular to the axial center line (center of rotation) of the drive disk 121. The positional relationship of the drive rollers 122 on the drive disk 121 may be similar to the gear teeth of a helical bevel gear of a prescribed cone angle. For more detailed description of the drive unit, see WO2008/139740A (US20100096905A1). The roller shafts are positioned such that the outer periphery of each drive roller 122 is located radially more outward than the outer periphery of the drive disk 121.

The main wheel 85 comprises an annular member 161 made of a ring having a polygonal cross section, a plurality of inner sleeves 162 fixedly fitted on the annular member 161 at a regular interval and a driven roller 164 rotatable supported by the outer circumferential surface of each sleeve 162 via a ball bearing 163. The driven rollers 164 are configured to engage a floor surface, and may each consist of a metal cylinder 164A fitted on the outer race of the ball bearing 163 and a rubber cylinder 164B integrally vulcanized onto the outer circumferential surface of the metal cylinder 164A.

The driven rollers 164 along with the associated inner sleeves 162 are arranged circumferentially along the entire circumference of the annular member 161, and the driven rollers 164 are each freely rotatable around the axial line thereof which is tangential to the corresponding position of the annular member 162. A disk shaped cover 166 (see FIG. 4) is interposed between each adjacent pair of driven rollers 164 so as to close the wedge shaped gap between the adjacent driven rollers 164 and thereby keep foreign matter from intruding into the ball bearings 163.

The inner diameter of the main wheel 85 is smaller than the outer diameter of each drive assembly 84. The outer diameter of the main wheel 85 is larger than the outer diameter of the drive assemblies 84. The inner and outer diameters of the main wheel 85 and each drive assembly 84 are defined by the corresponding envelopes of the drive rollers 122 and driven rollers 164, respectively. The main wheel 85 is thus interposed between the drive rollers 122 of the two drive assemblies 84L and 84R.

The drive rollers 122L and 122R frictionally engage the rubber cylinders 164B of the driven rollers 164 at their respective circumferential surfaces so that the rotation (or torque) of the drive rollers 122L and 122R can be transmitted to the driven rollers 164.

In the illustrated embodiment, the modes of rotation of the main wheel 85 and rotation of the driven rollers 164 are determined by the modes of rotation of the two drive disks 121L and 121R. When the two drive disks 121L and 121R are rotated at a same speed in a same direction, the main wheel 85 rotates circumferentially or around the central axial line A while the driven rollers 164 do not rotate around the respective axial lines so that the vehicle travels either in the forward or rearward direction depending on the rotational direction of the drive disks 121L and 121R.

When the two drive disks 121L and 121R are rotated at a same speed in opposite directions, the main wheel 85 remains stationary while the driven rollers 164 rotate around the respective axial lines so that the vehicle travels sideways depending on the rotational directions of the drive disks 121L and 121R.

When the two drive disks 121L and 121R are rotated at mutually different speeds, the main wheel 85 is rotated around the central axial line A at a speed corresponding to the average of the rotational speeds of the two drive disks 121L and 121R, and the drive rollers 164 are rotated around their respective axial lines at a speed corresponding to the difference between the rotational speeds of the two drive disks 121L and 121R.

Therefore, by suitably selecting the rotational speeds of the two drive disks 121L and 121R, the vehicle 1 is allowed to travel in any desired direction given as a composition of a fore-and-aft movement and a lateral movement.

The arrangement for attaching the drive unit 3 to the lower frame 22 is described in the following. As shown in FIG. 3, the upper half of the drive unit 3 is received in the receiving space 35 of the lower frame 22 such that the axial line thereof is directed laterally with respect to the frame 2. As shown in FIG. 5, the radial external flange of each mount member 81 of the drive unit 3 engages the peripheral edge of the cutout 36 in the side wall 33 of the lower frame 22 and the inner surface of the tongue piece 37.

As shown in FIG. 3, a step base 180 is attached to the outer surface of each side wall 33 of the lower frame 22. The step base 180 consists of a metallic annular member having an outer profile conforming to those of the cutout 36 and tongue piece 37. The radial external flange of each mount member 81 is formed with threaded holes, and corresponding through holes are formed in the peripheral part of the cutout 36 and tongue piece 37 so that the peripheral part of the cutout 36 and tongue piece 37 are firmly interposed between the step base 180 and radial external flange by passing threaded bolts into the through holes and threading them into the threaded holes of the radial external flange of each mount member 81. Thus, the two step bases 180 and the drive unit 3 are jointly attached to the lower frame 22.

As shown in FIG. 5, the lower part of the step base 180 is provided with an axial flange that is passed into the space defined between the two tongue pieces 37, and closely received by the inner circumferential surface of the mount member 81. The step base 180 is provided with a lower extension 181 having a base end including an upper part extending axially outward and a lower part generally depending therefrom. The base end of the lower extension 181 rotatably supports a base end of a step 183 via a pivot shaft extending in the fore and aft direction. The step 183 is rotatable between a retracted position extending upward along a side of the lower frame 22 and a deployed position extending laterally outward.

As shown in FIG. 3, the step load sensor 8 is attached to an outer surface of the step base 180. The load sensor 8 may consist of a per se know strain gauge configured to detect strain in the step base 180 when the step 183 is subjected to an external load typically consisting of a load applied by a foot of the vehicle occupant.

As shown in FIGS. 1 to 5, the lower end of the lower frame 22 is provided with a lower cover 185 which conceals the lower half of the drive unit 3 except for the ground contact area of the main wheel 85. To an outer side of each side wall 33 of the lower frame 22 is attached a side cover 186 which conceals the step base 180, but is provided with an opening to allow the step 183 to extend laterally and raised upward and the lower extension 181 to be externally exposed.

Figure 9:
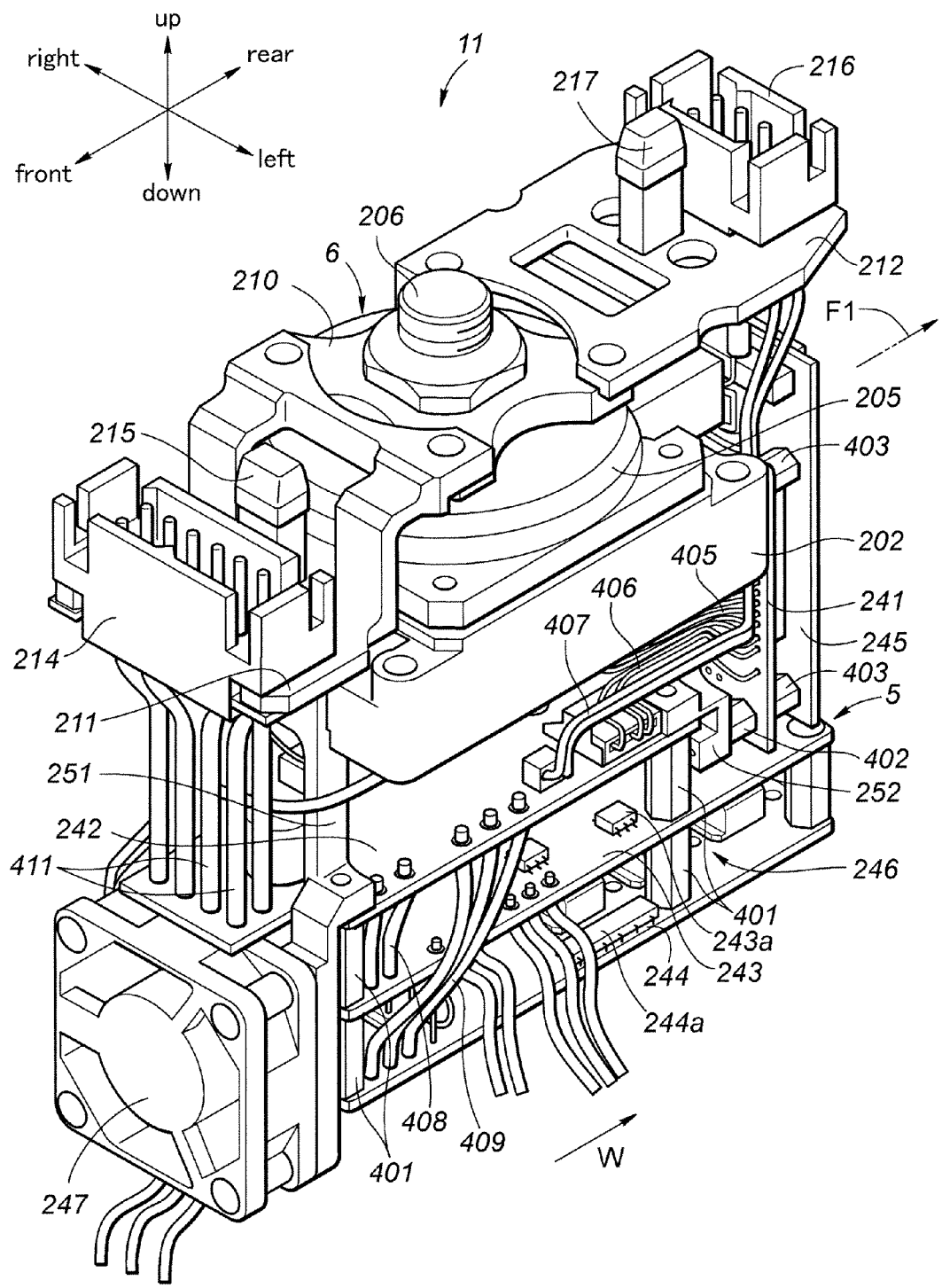
FIG. 9 is a perspective view of an electric unit of the vehicle.

Referring to FIGS. 8 and 9, the various components of the electric unit 11 such as the control unit 5, upper load sensor 6 and inclination sensor 7 are fixedly attached to an electric mount frame 202.

A shown in FIG. 8, to the inner surface of an upper end of each side wall 33, adjacent to the upper opening 31, is fixedly attached a metallic support base 53 which includes a horizontal plate section extending in the fore and aft direction, and a pair of threaded holes 54a are formed in the support portions 54 provided in the horizontal plate section one behind the other.

The electric mount frame 202 essentially consists of a rectangular planar member defining a rectangular central opening, and rests upon the support bases 53 along the side edges thereof. Each side edge of the electric mount frame 202 is provided with a pair of mounting portions 203 formed with through holes 203a so as to correspond to the threaded holes 54a of the support bases 53.

The upper load sensor 6 consists of a tri-axial force sensor that can detect moments around the z-axis (vertical direction), x-axis (for and aft direction) and y-axis (lateral direction), and includes a body portion 205 receiving a sensor circuit board (not shown in the drawings) and fixedly attached to the upper surface of the electric mount frame 202 by threaded bolts, and an input shaft 206 extending upward from the body portion 205 and formed with a male thread along the length thereof.

As illustrated in FIGS. 4, 8 and 9, the body portion 205 is mounted on the electric mount frame 202, and fixedly secured thereto by using threaded bolts. The output shaft 206 is threaded into a threaded central opening of a planar connecting member base 210, and a free end of the output shaft 206 projects upward from the connecting member base 210.

Referring to FIG. 9, a first connector base 211 is attached to a front part of the connecting member base 210 by using threaded bolts, and extends forward. A first connector 214 which is electrically connected to the wiring from a power source circuit board 242 (which will be described hereinafter) is secured to the first connector base 211 by using threaded bolts. The first connector base 211 is provided with a first guide pin 215 extending upward.

A second base 212 is attached to a rear part of the connecting member base 210 by using threaded bolts, and extends rearward. A second connector 216 which is electrically connected to the wiring from a control circuit board 241 (which will be described hereinafter) is secured to the second connector base 212 by using threaded bolts. The second connector base 216 is provided with a second guide pin 217 extending upward.

Referring to FIG. 8, the inclination sensor 7, which may consist of a per se known gyro sensor, is passed downward inside the electric mount frame 202, and fixedly secured thereto by using threaded bolts. The inclination sensor 7 is configured to detect an inclination angle thereof relative to a plumb vertical direction.

As shown in FIG. 9, the control unit 5 includes, in addition to the control circuit board 241 and power source circuit board 242, a left motor driver circuit board 243, a right motor driver circuit board 244, an I/O interface circuit board 245 and a blower fan 247.

The control circuit board 241 includes a control circuit 261 (FIG. 10) which is incorporated with a CPU formed by a microcomputer, and used for controlling the electric motors 82 and other components. The control circuit board 241 is mounted on a rear side of the electric mount frame 202 so as to extend both vertically and laterally (or with the major surface thereof facing in the fore and aft direction). The lower part of the control circuit board 241 extends downward well beyond the lower side of the electric mount frame 202 or the housing of the inclination sensor 7. Furthermore, the electric mount frame 202 (inclination sensor 7), control circuit board 241 and power source circuit board 242 are arranged so as to present a rectangular C-shaped cross section as seen from a side. Thus, the length of signal lines 405 between the control circuit board 241 and the inclination sensor 7, and the lengths of power lines 406 and signal lines 407 between the control circuit board 241 and power circuit board 242 can be minimized, and this also contributes to the compact design.

The power source circuit board 242 includes a power control circuit (not shown in the drawings) for converting the voltage of the power supplied by the battery unit 10 to a prescribed voltage. The power source circuit board 242 extends both laterally and in the fore and aft direction (or with the major surface thereof facing vertically), and is fixedly attached to the electric mount frame 202 via a first connecting member 251 extending downward from the front end of the electric mount frame 202. The rear end of the power source circuit board 242 is connected to the lower end of the control circuit board 241 via a second connecting member 252. Thus, the length of power lines 408 between the power source circuit board 242 and left motor drive circuit board 243, and the length of power lines 409 between the power source circuit board 242 and right motor drive circuit board 244 can be minimized, and this also contributes to the compact design.

Figure 10:
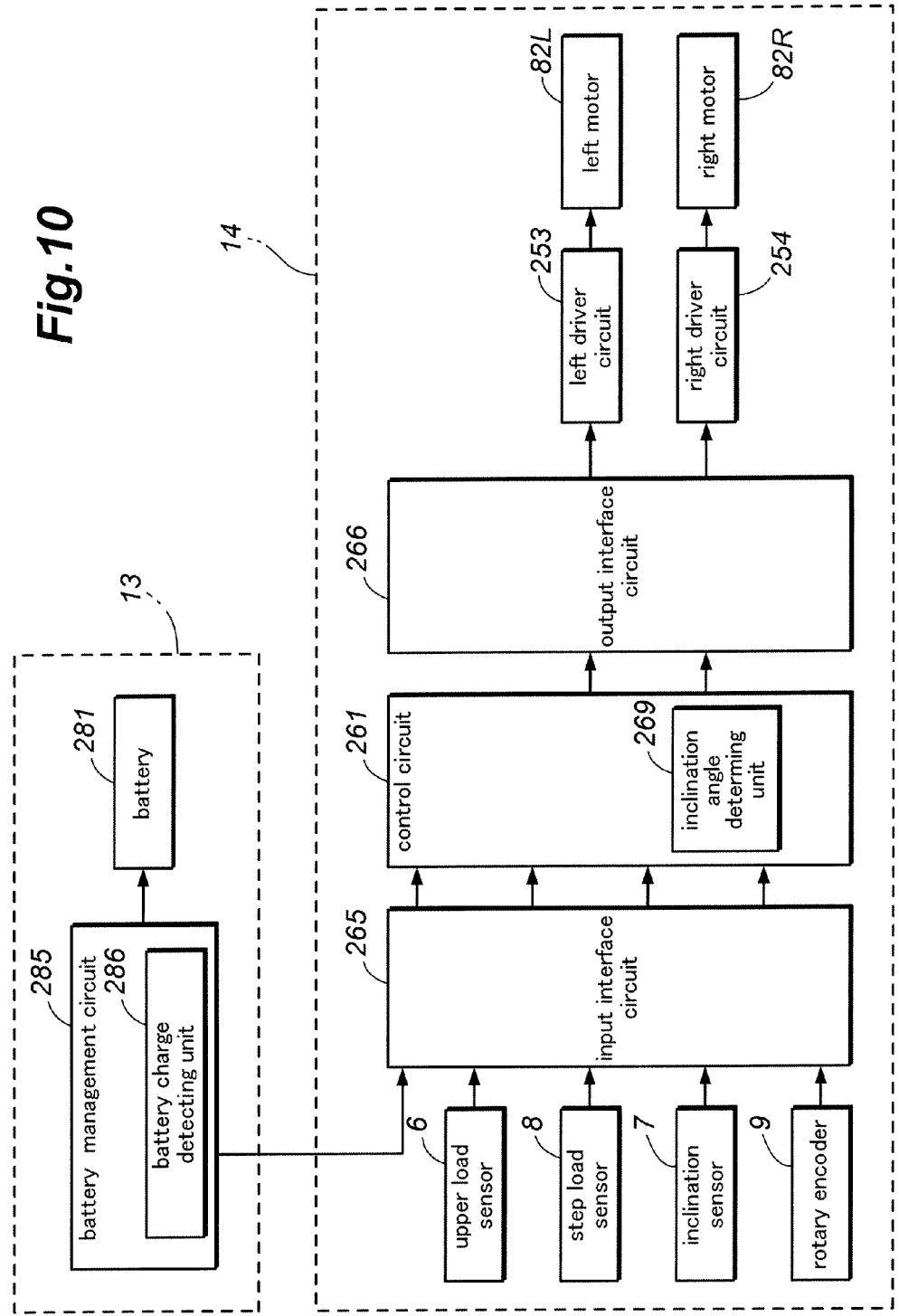
FIG. 10 is a block diagram of the overall control system of the vehicle.

The left motor driver circuit board 243 and right motor driver circuit board 244 include a left motor driver circuit (inverter circuit) 253 and a right motor driver circuit (inverter circuit) 254 used for the PWM control of the left and right electric motors 82L and 82R, respectively (see FIG. 10). The left motor driver circuit board 243 is fixedly attached to the power source circuit board 242 via a spacer 401 from below in parallel thereto. The right motor driver circuit board 244 is fixedly attached to the left motor driver circuit board 243 via a spacer 401 from below in parallel thereto. Thereby, an air flow passage 246 extending in the fore and aft direction is defined between the left motor driver circuit board 243 and right motor driver circuit board 244.

The I/O interface circuit board 245 includes an input interface circuit 265 and an output interface circuit 266 (see FIG. 10), and is fixedly attached to the electric mount frame 202 via a spacer 403 behind the control circuit board 241 in parallel thereto. The I/O interface circuit board 245 extends both vertically and laterally behind the control circuit board 241 which is in turn located behind the rear end of the power source circuit board 242.

The blower fan 247 consisting of an axial flow fan is connected to the lower end of the first connecting member 251 so as to face the space or the flow passage 245 between the left motor driver circuit board 243 and right motor driver circuit board 244, and forwards an air flow into the space.

In the electric unit 11, because the load sensor 6, inclination sensor 7 and power source circuit board 242, and left and right motor driver circuit boards 243 and 244 are arranged vertically from above in that order, a compact structure is achieved, and the freedom in the design of the frame is improved. Also, the electric unit 11 can be exposed for easy access by separating the upper frame 21 from the lower frame 22 so that the maintenance of the electric unit 11 is facilitated by using a highly simple structure.

The structure for securing the electric unit 11 to the lower frame 22 is described in the following. As shown in FIG. 8, each through hole 203a of the electric mount frame 202 is fitted with a rubber bush 270 consisting of two identical halves 270A and 270B each including a tubular portion received in the through hole 203 and a radial flange radially outwardly extending over the corresponding surface of the electric mounting portion 203 surrounding the through hole 203. After placing the electric mount frame 202 on the support bases 53 of the lower frame 22 via the corresponding flanges of the rubber bushes 270, threaded bolts B1 are passed into the through holes 203a (or central holes of the rubber bushes 270), and threaded into the threaded holes 54a of the support bases 53. Thus, the rubber bushes 270 insulate and protect the electric mount frame 202 from the vibrations that may otherwise be transmitted from the lower frame 22.

The electric unit 11, in its installed state, is located in the narrow section 2A connected to an upper part of the lower frame 22, and, in particular, the blower fan 247, left motor driver circuit board 243 and right motor driver circuit board 244 are located between the two sets of vent openings 39A and 39B formed in the front and rear walls 34A and 34B of the lower frame 22, respectively, so that the cooling air introduced from the front vent openings 39A is passed through the blower fan 247 and the space 246 between the left and right motor driver circuit boards 243 and 244 before being expelled from the rear vent openings 39B. Therefore, the left and right motor driver circuit boards 243 and 244 including power devices 243a and 244a which are the major sources of heat among the various components of the electric unit 11 can be efficiently cooled. Also, as the electric unit 11 is located in the narrow section 2A in an upper part of the lower frame 22, the flow path between the two sets of vent openings 39A and 39B is relatively short, and this also contributes to the efficient cooling of the electric unit 11.

As shown in FIGS. 4 and 6, the batter unit 10 includes a battery 281 consisting of two arcuate parts, one received in the front space 26A and the other in the rear space 26B, and a pair of battery management circuit boards 282. Each part of the battery 281 consists of a plurality of battery modules. The battery modules are each cylindrical in shape (not shown in the drawings), and are bundled together so as to fit in the inner space of the upper frame 21. The battery management circuit boards 282 include a battery management circuit 285 comprising a CPU formed by a microcomputer and associated memory (see FIG. 10). The battery management circuit 285 is connected to the battery 281 so as to control the charging and discharging of the battery 281, and select the battery modules that are to be used at each particular moment according to the remaining charge of the battery 281 detected by a battery charge detecting unit 286 which will be described hereinafter.

The battery management circuit boards 282 are not required to be provided on the battery 281 or adjacent thereto, but may also be provided within the electric unit 11. However, by placing the battery management circuit boards 282 as a part of the battery unit 11 within the upper frame 21, the recharging of the battery 181 can be conveniently performed. For instance, the upper frame 21 (upper structure 13) may be stored after fully recharging the battery 281 therein so as to be interchangeably used for different lower frames 22 (lower structures 14).

The two parts of the battery 281 of the battery unit 10 are passed into the front space 26A and rear space 26B, respectively, from the lower opening 25 of the upper frame 21, and is supported from below by a battery bracket 291 which is in turn secured to the support bases 51 of the upper frame 21 by using threaded bolts. By thus distributing the weight of the battery unit 10 between the front and rear parts of the upper frame 21, the gravitational center of the upper frame 21 is prevented from offsetting in the fore and aft direction, and this simplifies the inverted pendulum control of the vehicle 1 and the transportation of the vehicle 1 by using the grip handle 71.

Referring to FIG. 6, the third connector base 294 is fixedly attached to the front end of the battery bracket 291 by using threaded bolts, and extends forward therefrom. A fourth connector base 295 is fixedly attached to the rear end of the battery bracket 291 by using threaded bolts, and extends rearward therefrom.

A third connector 297 is secured to the third connector base 294 by using threaded bolts, and is electrically connected to the wiring extending from the battery management circuit boards 282. The third connector 297 is complementary to the first connector 214 so as to be connected thereto, and is provided with a first guide hole 298 extending in the vertical direction and configured to receive the first guide pin 215 of the first connector base 211.

A fourth connector 301 is secured to the fourth connector base 295 by using threaded bolts, and is electrically connected to the wiring extending from the switch panel 40. The fourth connector 301 is complementary to the second connector 216 so as to be connected thereto, and is provided with a second guide hole 302 extending in the vertical direction and configured to receive the second guide pin 217 of the second connector base 212.

The structure for connecting the upper structure 13 including the upper frame 21, seat assembly 4 and battery unit 10 to the lower structure 14 including the lower frame 22, drive unit 3 and electric unit 11 is described in the following with reference to FIGS. 3 and 9. In FIG. 9, some of the components are omitted from the illustration for the convenience of illustration. When joining the upper and lower structures 13 and 14 to each other, the lower opening 25 of the upper frame 21 is opposed to the upper opening 31 of the lower frame 22, and the first guide pin 215 of the lower structure 14 is fitted into the first guide hole 298 of the upper structure 13 while the second guide pin 217 of the lower structure 14 is fitted into the second guide hole 302 of the upper structure 13. This causes the first connector 214 to be connected to the third connector 297, and the second connector 216 to the fourth connector 301. Thereby, the upper and lower structures 13 and 14 are electrically connected to each other so that distribution of electric power and transmission of control signals can be effected between the upper and lower structures 13 and 14.

The lower surface of the wall part of the upper frame 21 defining the recess 29 abuts the upper surface of the connecting member base 210 connected to the input shaft 206 of the upper load sensor 6, and the free end of the input shaft 206 is passed upward through the central connecting hole 30 of the recess 29. By threading a nut 314 onto the input shaft 206, the bottom wall of the recess 29 is firmly held between the connecting member base 210 and nut 314, and the upper frame 21 is supported by the input shaft 206 of the upper load sensor 6. The upper opening 31 of the lower frame 22 is slightly smaller that the lower opening 25 of the upper frame 21 so that the peripheral wall defining the upper opening 31 is received by the lower opening 25 of the upper frame 21.

Thus, the upper structure 13 is supported by the lower structure 14 solely via the load sensor 6 so that the load created by the seating of a vehicle occupant D on the seat assembly 4 is transmitted to the input shaft 206 of the upper load sensor 6 via the upper structure 13.

As shown in FIG. 10, the control circuit 261 receives signals from the upper load sensor 6, inclination sensor 7, step load sensors 8, rotary encoders 9 and battery management circuit 285 via the input interface circuit 265. The control circuit 261 is configured to generate PWM signals for driving the left driver circuit 253 and right driver circuit 254 via the output interface circuit 266 so as to maintain the vehicle 1 in an upright posture or perform the inverted pendulum control according to the received signals.

The upper load sensor 6 forwards a signal corresponding to the load applied to the input shaft 206 to the control circuit 261. Each step load sensor 8 forwards a signal corresponding to the load applied to the corresponding step 183 to the control circuit 261. The inclination sensor 7 forwards a signal corresponding to the inclination thereof with respect to a prescribed reference line to the control circuit 261. Each rotary encoder 9 forwards a signal corresponding to the angular position of the corresponding rotor shaft (output shaft) to the control circuit 261.

The control circuit 261 computes the load applied to the input shaft 206 according to the signal received from the upper load sensor 6, and determines if a vehicle occupant is seated on the seat assembly 4 by comparing the computed load with a prescribed threshold value. The control circuit 261 also computes the loads applied to the steps 183 according to the signals from the step load sensors 8, and determines if and how the vehicle occupant is placing his or her feet on the steps 183 by comparing the computed loads with prescribed threshold values.

According to the results of determining if a vehicle occupant is seated on the seat assembly 4 and if the vehicle occupant is placing his or her feet on the steps 183, the control circuit 261 determines the presence of a vehicle occupant and the riding posture of the vehicle occupant. In the illustrated vehicle 1, the vehicle occupant D may ride the vehicle 1 either in a sitting posture by sitting on the seat assembly 4 as illustrated in FIG. 11a or in a standing posture by standing on the steps 183 and interposing the seat assembly 4 (which is in the retracted position at such a time) or in particular the cushion parts thereof between the knees and thighs of the vehicle occupant as illustrated in FIG. 11b. When no one is sitting on the seat assembly 4 and no feet are placed on the steps 183, it is then determined that there is no vehicle occupant on the vehicle 1. If the presence of a burden on the seat assembly 4 is detected by the upper load sensor 6, it can be determined that there is a vehicle occupant in the sitting posture. If the presence of feet on the steps 183 is determined by using the step load sensors 8, it can be determined that there is a vehicle occupant in the standing posture.

The control circuit 261 computes the rotational speeds of the two electric motors 82 according to the signals from the rotary encoders 9, and use the obtained speeds for the drive control of the two electric motors 82.

The control circuit 261 computes an inclination angle $\theta$ of the axial line B connecting the rotational center A of the main wheel 85 and the gravitational center of the vehicle 1 including the vehicle occupant D with respect to a vertical (plumb) line according to the signal from the inclination sensor 7 by using an inclination angle determining unit 269 configured to execute a prescribed computing process. FIG. 11b shows the state where $\theta$ has a small value which may be a prescribed reference value. In the xyz rectilinear coordinate system having an x-axis extending in the fore and aft direction (positive in the forward direction and negative in the rearward direction), a y-axis extending in the lateral direction (positive in the rightward direction and negative in the leftward direction) and a z-axis extending in the vertical direction (positive in the upward direction and negative in the downward direction), the inclination angle $\theta$ may have an x-component $\theta x$ or an inclination angle in the x-axis direction, and a y-component $\theta y$ or an inclination angle in the y-axis direction.

The control circuit 261 performs the inverted pendulum control according to the inclination angle $\theta$. In the inverted pendulum control, the vehicle 1 is moved by using the drive unit 3 so that the combined gravitational center of the vehicle 1 itself and vehicle occupant is positioned approximately above the road contact point of the drive unit 3 (main wheel 85), and the inclination angle $\theta$ coincides with a reference angle $\theta t$ given as a control target value. As the position of the combined gravitational center varies depending on the presence of the vehicle occupant and the riding posture of the vehicle occupant, the reference angle $\theta t$ is defined individually for the vehicle 1 without a vehicle occupant, the vehicle carrying a vehicle occupant in a sitting posture and the vehicle carrying a vehicle occupant in a standing posture.

The control circuit 261 generates PWM signals for controlling the left driver circuit 253 and right driver circuit 254 so as to agree the inclination angle $\theta$ with the reference angle $\theta t$ for each of the vehicle occupant situations. According to the given PWM signals, the left driver circuit 253 and right driver circuit 254 supply electric power to the electric motors 82 to actuate them in a corresponding manner.

The structure described in the foregoing allows the vehicle 1 to maintain an upright posture (or substantially upright posture) in which the axial line of the lower structure 14 agrees with the reference angle $\theta t$ by virtue of the inverted pendulum control. The vehicle 1 is driven by the vehicle operator shifting his or her weight in a prescribed direction. When the weight of the vehicle operator is shifted in a desired direction, the axial line of the lower structure tilts in the desired direction. The control circuit 261 then drives the drive unit 3 so as to agree the inclination angle with the reference angle of the corresponding vehicle occupant situation, and this causes the vehicle to travel in the desired direction.

In the vehicle described above, because the drive unit 3 and battery unit 10 which account for a large part of the weight of the vehicle 1 are spaced away from each other in a vertical direction, and the inclination sensor 7 is placed between them, not only the vehicle can be constructed in a highly compact manner but also the inclination sensor 7 can be placed approximately on the gravitational center of the vehicle 1 or in the narrow section 2A. This contributes to the minimization in the error in estimating the acceleration (or the inclination angle of the vehicle 1) based on the detection result of the inclination sensor 7, and this improves the control response of the system. Furthermore, as the weight of the vehicle is balanced along the lengthwise (vertical) direction thereof, the transportation of the vehicle 1, for instance by orienting it sideways, can be facilitated.

In the foregoing embodiment, because the seat assembly 4 is provided on the upper frame 21, the weight of the seat assembly 4 combined with the weight of the battery unit 10 helps to match the weight of the upper structure 13 with that of the lower structure 14 (which is normally heavier owing to the presence of the drive unit 3). Also, the presence of the steps 183 in the lower frame 22 allow the load of the vehicle occupant to be distributed between the upper frame 21 and lower frame 22, and this not only contributes to the even distribution of the load on the frame 2 but also helps the gravitational center of the vehicle 1 to coincide with the position of the inclination sensor.

Figure 12:
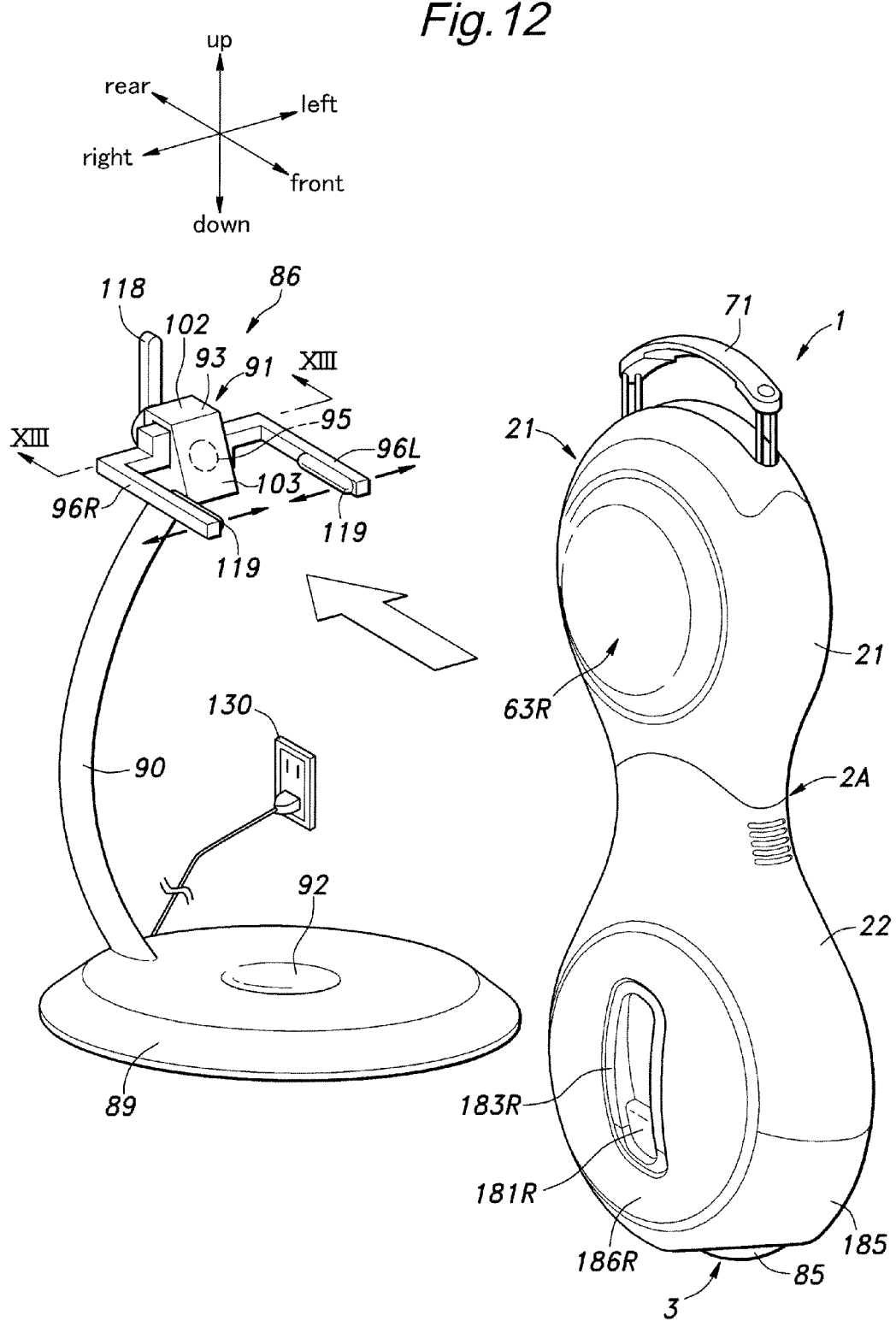
FIG. 12 is a perspective view showing the vehicle and a stand for supporting the vehicle in an upright posture.

The arrangement for recharging the battery 281 is now described in the following with reference to FIGS. 1 and 12. FIG. 12 shows a stand 86 configured to support the vehicle 1 in an upright posture, and is incorporated with a recharging system 87 (FIG. 15) fore recharging the battery 281 while the vehicle 1 is supported by the stand 86.

As shown in FIG. 3, a receiving coil 88 is attached to the inner surface of the rear wall of the upper frame 21 adjacent to the lower opening 25. The receiving coil 88 is electrically connected to the battery 281 via the battery management circuit 285 contained in the battery management circuit boards 282.

As shown in FIG. 12, the stand 86 includes a disk-shaped base 89 configured to be flatly placed on a floor surface, a pillar 90 extending upright from a peripheral part of the base 89 and a support portion 91 provided on the free end or upper end of the pillar 90. The upper surface of the base 89 is formed with a central recess 92 configured to receive the road contact region of the main wheel 85 of the vehicle 1.

Figure 13:
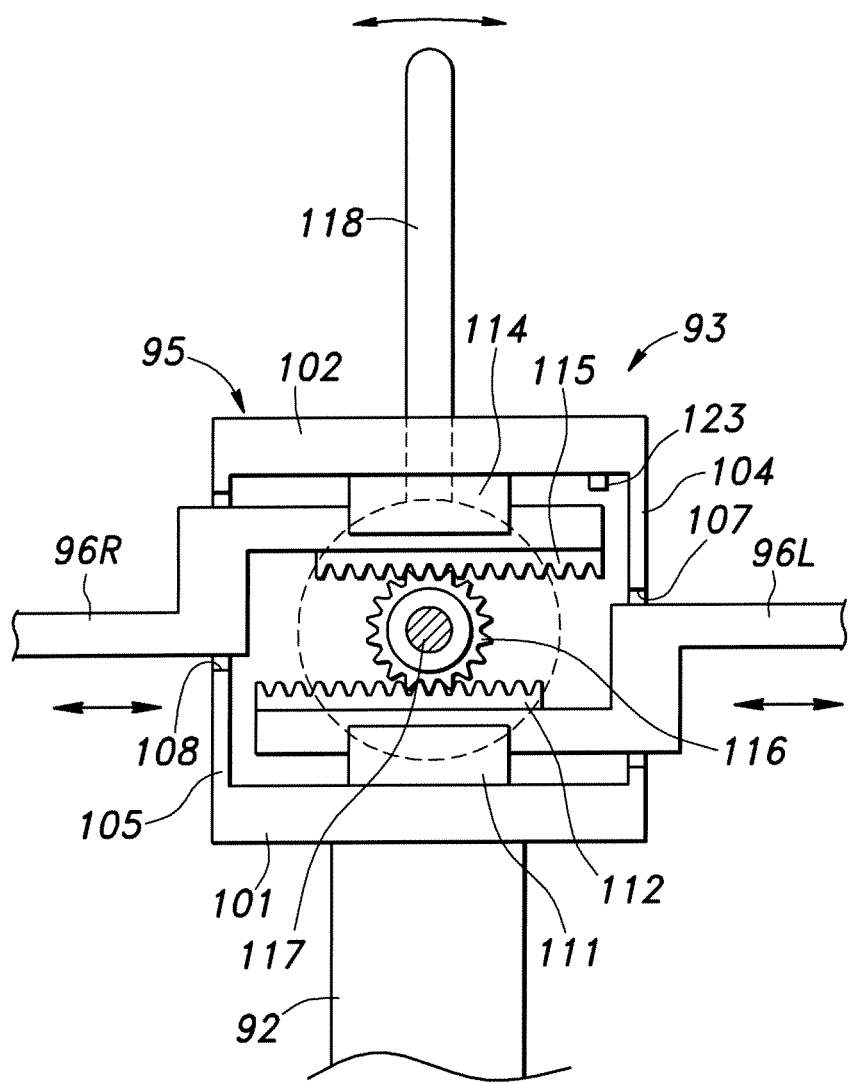
FIG. 13 is a sectional view taken along line XIII-XIII of FIG. 12.
Figure 14:
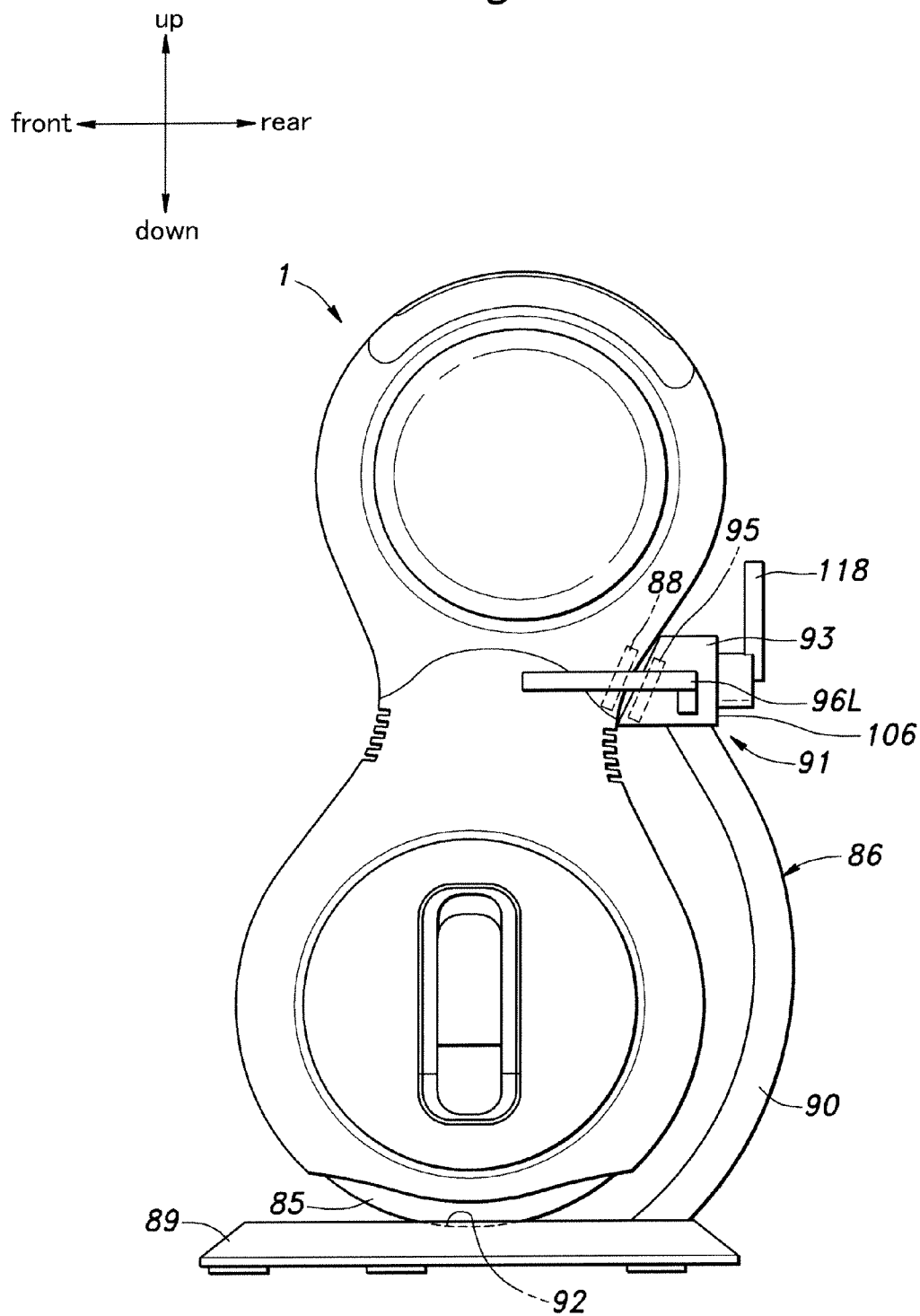
FIG. 14 is a side view showing the vehicle supported by the stand.

The support portion 91 comprises a casing 93, a pair of arm members 96 having main parts extending from the casing 93 in a mutually spaced and parallel relationship and a feed coil 95 received within the casing 93. The casing 93 consists of a substantially rectangular box including a bottom wall 101 (FIG. 13), an upper wall 102, a front wall 103, a pair of side walls 104 and 105 and a rear wall 106 (FIG. 14). The bottom wall 101 is attached to the free end of the pillar 90. The front wall 103 is slightly tilted so as to face an obliquely upward direction. The side walls 104 and 105 are formed with openings 107 and 108, respectively, for receiving the base ends of the arm members 96 which extend laterally from the casing 93 at their based ends as best shown in FIG. 13. Each arm member 96 is thus provided with the shape of letter-L in plan view.

In the illustrated embodiment, the feed coil 95 is placed on the inner surface of the front wall 103. However, the feed coil 95 may also be placed on the outer surface of the front wall 103, or embedded, encapsulated or otherwise at least partially buried within the front wall 103.

Referring to FIG. 13, the base end of the left arm member 96L which is passed into the through hole 107 of the left side wall 104 is guided by a guide rail 111 fixedly attached to the upper face of the bottom wall 101 for a lateral linear movement, and the base end of the right arm member 96R which is passed into the through hole 108 of the right side wall 105 is guided by a guide rail 114 fixedly attached to the lower face of the upper wall 102 for a lateral linear movement. The upper side of the base end of the left arm member 96L is formed with rack teeth, and the lower side of the base end of the right arm member 96R is likewise formed with rack teeth.

The two sets of rack teeth thus oppose each other, and a pinion 116 meshes with the rack teeth. The pinion 116 is coaxially provided with a pivot shaft 117 which is rotatably supported by the rear wall 106, and extends out of the rear wall 106. The free end of the pivot shaft 117 extending out of the rear wall 106 is fixedly fitted with a lever arm 118 extending radially therefrom. The free end of each arm member 96 extends above the base 89, and is provided with a cushion member 119 on a side thereof facing the other arm member 96.

Therefore, by operating the lever arm 118 so as to turn the pinion 116, the free ends of the arm members 96 are caused to move toward and away from each other in unison. When the arm members 96 are spaced away from each other, the narrow section 2A of the vehicle 1 can be easily received in the space between the arm members 96. By moving the two arm members 96 toward each other from this condition, the narrow section 2A of the vehicle 1 can be held securely between the two arm members 96 from the two lateral sides of the frame 2, and the vehicle 1 can be held in a prescribed position. Although not shown in the drawings, the casing 93 is provided with a locking device that can fix the lever arm 118 at any angular position so that the arm members 96 may be fixed in any desired position, and is enabled to firmly hold the narrow section 2A.

A position sensor 123 is attached to the lower surface of the upper wall 102 for detecting the position of the arm member 96R which may consist of a proximity sensor for detecting the presence of the arm member 96R at a prescribed position. In particular, the position sensor 123 is configured to detect the extent of the movement of the base end of the arm member 96R into the casing 93 or if the free ends of the two arm members 96 have come close enough to held the narrow section 2A therebetween. The position sensor 123 may also consist of a contact limit switch, and may also be configured to detect the angular position of the lever arm 118.

As shown in FIG. 14, the stand 86 allows the vehicle 1 which is powered off to lean against the stand 86. The lower end of the vehicle 1 is held in position by the main wheel 85 being received by the recess 92 in the base 89. The upper part of the vehicle is held in position by the narrow section 2A being squeezed between the two arm members 96. Thereby, the receiving coil 88 of the vehicle 1 is caused to squarely oppose the feed coil 95 of the stand 86, and a required electric coupling between the feed coil 95 and receiving coil 88 can be established.

When the user desires to have the stand 86 support the vehicle 1, the user powers off the vehicle 1 while holding the grip handle 71 as a precaution to avoid the vehicle 1 from falling down. Once the power is turned off, the vehicle 1 is unable to stand upright by itself. The user then lifts the vehicle 1 to place the lower end of the main wheel 85 in the recess 92 of the base 89, and let the vehicle 1 lean against the front wall 103 of the casing 93. Alternatively, the power of the vehicle 1 may be turned off after placing the main wheel 85 in the recess 92. Once this state is reached, the vehicle 1 may be held in this position by turning the lever arm 118 in an appropriate direction to hold the narrow section 2A of the vehicle 1 between the two arm members 96.

Figure 15:
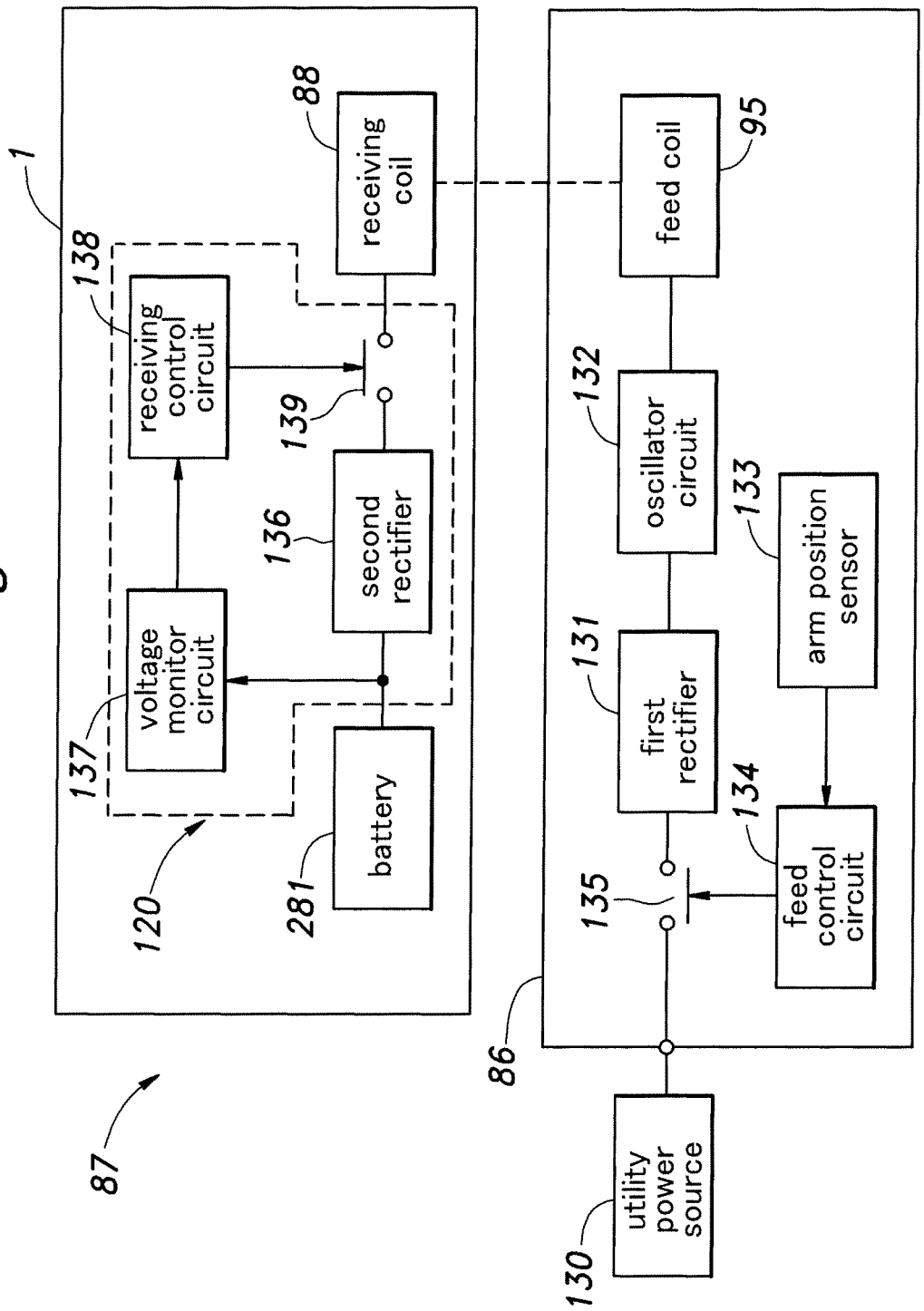
FIG. 15 is a block diagram of the recharging system for recharging the rechargeable battery of the vehicle.

FIG. 15 shows the details of the recharging system 87 which includes a first part provided in the stand 86 and a second part provided in the vehicle 1. The first part includes a first rectifier 131, an oscillator circuit 132, an arm position sensor 133, a feed control circuit 134 and a first switch 135, in addition to the feed coil 95. The second part includes a second rectifier 136, a voltage monitor circuit 137, a receiving control circuit 138 and a second switch 139, in addition to the receiving coil 88. In the illustrated embodiment, a commercial utility power source 130 is used for supplying electric power to the first part of the recharging system 87 incorporated in the stand 86. However, a battery or any other power source may be use for the first part of the recharging system 87.

The commercial utility power source 130 may be a 50 Hz or 60 Hz AC power source, and is connected to the first rectifier 131 via a power cable and the first switch 135. The first switch 135 is under the control of the feed control circuit 134 according to the signal obtained from the arm position sensor 133. In the illustrated embodiment, when the two arm members 96 have reached the position to grip the vehicle 1, the first switch 135 is closed, and this causes the power of the commercial utility power source 130 to be supplied to the first rectifier 131.

The first rectifier 131 rectifies the AC power supplied by the commercial utility power source 130, and converts it into DC power. The output of the first rectifier 131 is forwarded to the oscillator circuit 132 which chops the DC electric power into pulse power of a prescribed frequency and duty ratio. The prescribed frequency is selected as a value suitable for electromagnetic coupling, and may be in the range of tens of KHz to hundreds of kHz. The oscillator circuit 132 is connected to the feed coil 95 which produces a magnetic field based on the pulse power of the prescribed frequency.

The magnetic field produced by the feed coil 95 electromagnetically induces electric current in the receiving coil 88. This current has the same frequency and duty ratio as that conducted through the feed coil 95. The electric current induced in the receiving coil 88 is forwarded to the second rectifier 136 via the second switch 139. The second switch 139 is under the control of the receiving control circuit 138. The second rectifier 136 rectifies the current induced in the receiving coil 88, and converts it into DC power which is then fed to the onboard battery 281 and voltage monitor circuit 137.

Figure 16:
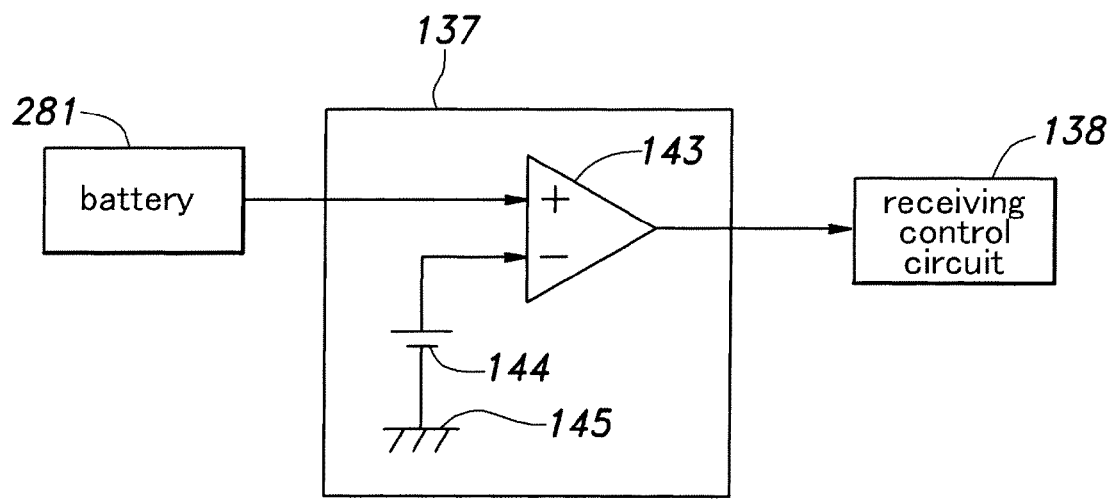
FIG. 16 shows the details of the voltage monitor circuit shown in FIG. 15.

The voltage monitor circuit 137 monitors the voltage of the onboard battery 281, and forwards a corresponding signal to the receiving control circuit 138. As shown in FIG. 16, the voltage monitor circuit 137 comprises an operational amplifier 143, a reference voltage source 144 and a ground voltage source 145. The non-inverting input of the operational amplifier 143 receives the voltage of the onboard battery 281, and the inverting input of the operation amplifier 143 receives the voltage of the reference voltage source 144. When the voltage of the onboard battery 281 is higher than the reference voltage Vth of the reference voltage source 144, the operational amplifier 143 forwards a high level signal H to the receiving control circuit 138. Conversely, when the voltage of the onboard battery 281 is lower than the reference voltage Vth of the reference voltage source 144, the operational amplifier 143 forwards a low level signal L to the receiving control circuit 138. Thus, the second rectifier 136, voltage monitor circuit 137, receiving control circuit 138 and second switch 139 jointly form a charging control unit 120 that controls the recharging of the battery 281 so as not to overcharge the battery 291 and charge the battery 281 at an optimum rate at all times.

Figure 17:
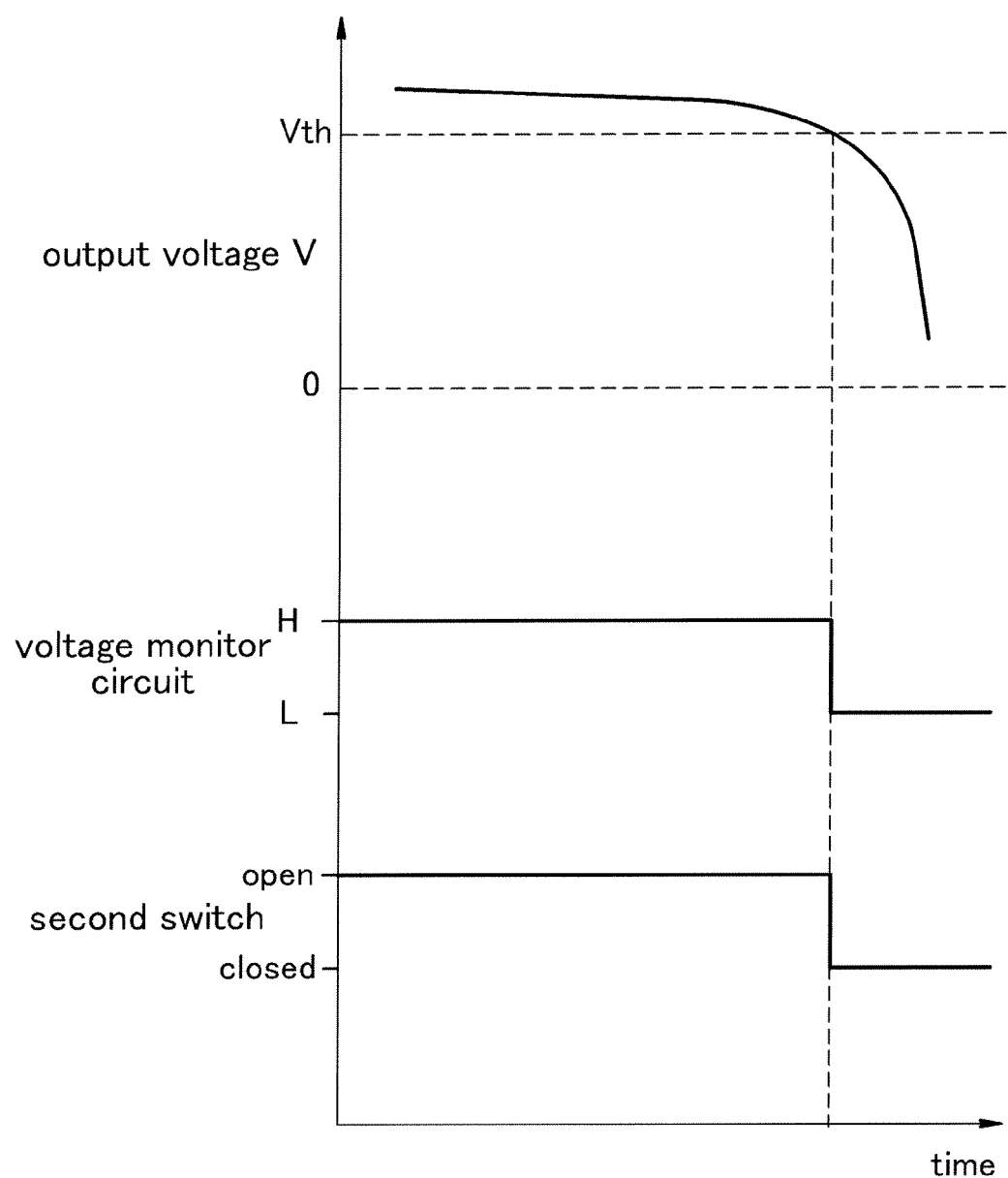
FIG. 17 is a time chart illustrating the mode operation of the recharging system.

FIG. 17 shows a typical change in the output voltage of the onboard battery 281. As long as the voltage of the onboard battery 281 is higher than the reference voltage Vth of the reference voltage source 144, the voltage monitor circuit 137 forwards a high level signal H to the receiving control circuit 138. The output voltage of the onboard battery 281 diminishes over time due to the discharging of the onboard battery 281. When the output voltage of the onboard battery 281 is below the reference voltage Vth, the voltage monitor circuit 137 forwards a low level signal L to the receiving control circuit 138.

The receiving control circuit 138 opens the second switch 139 upon receiving the H signal from the voltage monitor circuit 137, and closes the second switch 139 upon receiving the L signal from the voltage monitor circuit 137. In other words, when the output voltage of the onboard battery 281 is higher than the reference voltage Vth, the supply of electric power from the receiving coil 88 to the onboard battery 281 is shut off by opening the second switch 139. When the output voltage of the onboard battery 281 is lower than the reference voltage Vth, the supply of electric power from the receiving coil 88 to the onboard battery 281 is enabled by closing the second switch 139.

Figure 18:
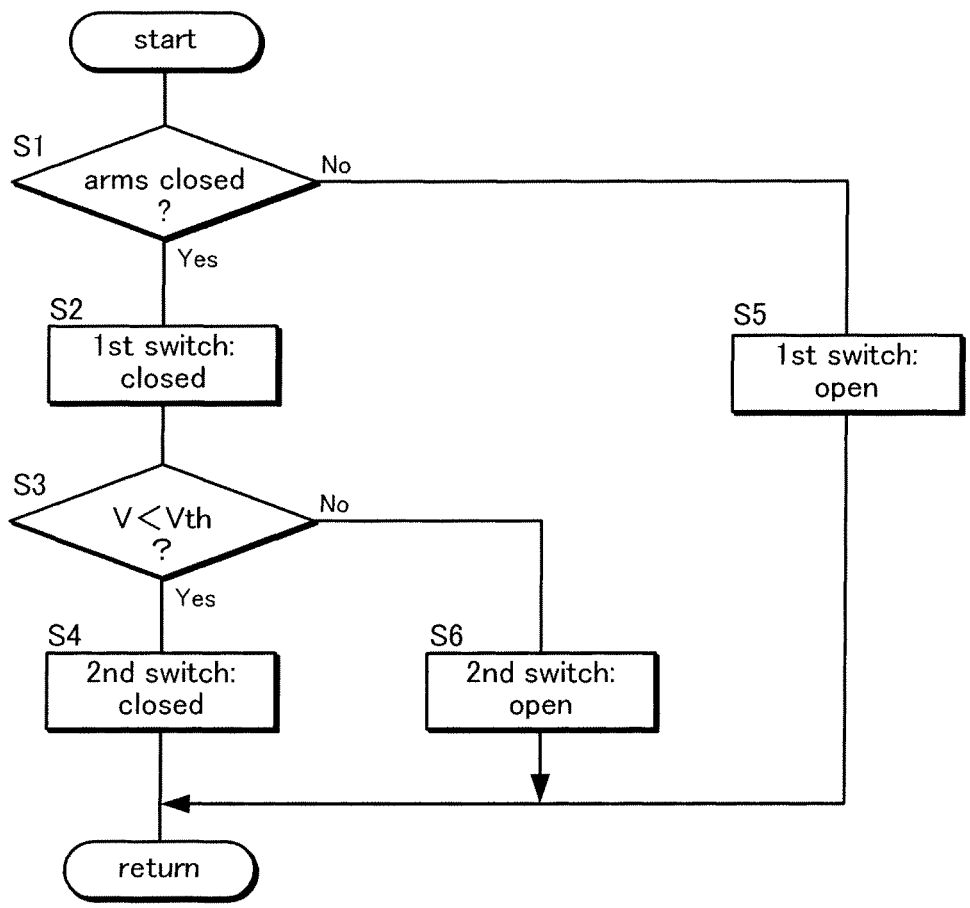
FIG. 18 is a flowchart showing the control process of the recharging system.

The control process executed for the recharging system 87 is described in the following with reference to the flowchart of FIG. 18. First of all, the feed control circuit 134 determines if the arm members 96 have reached a prescribed position according to the signal obtained from the arm position sensor 133 (step S1). If the result of this determination step is Yes, the first switch 125 is closed (step S2). Thereby, AC current is supplied to the feed coil 95, and this causes a magnetic field to be produced by the feed coil 95. Thus, when the vehicle 1 is held between the arm members 96, and the vehicle 1 is properly positioned with respect to the stand 86, the recharging system 87 initiates the recharging of the onboard battery 281 of the vehicle 1. On the other hand, if the determination result of step S1 is No, the first switch 135 is kept open, and no electric current is supplied to the feed coil 95 (step S5).

Once the first switch 124 is closed, and the recharging system is made ready for recharging the battery 281, the receiving control circuit 138 determines if the output voltage V of the onboard battery 291 is lower than the reference voltage Vth according to the signal obtained from the voltage monitor circuit 138 (step S3). If this determination result is Yes, the second switch 139 is closed (step S4). Thereby, the electric current induced in the receiving oil 88 is supplied to the onboard battery 281 via the second rectifier 136, and the onboard battery 281 is electrically charged. Conversely, if the determination result of step S3 is No, the second switch 139 is kept open, and no electric current is supplied to the onboard battery 281. Thereby, the onboard battery 281 is recharged only when the output voltage thereof is lower than the reference voltage Vth, and is prevented from being overcharged.

The recharging system 87 of the illustrated embodiment allows the vehicle 1 to be placed at a prescribed position of the stand 86 suitable for recharging the battery 281 in a simple manner, and the electrical connection between the stand 86 and vehicle 1 can be accomplished without physical contact or without requiring any connector owing to the use of the feed coil 95 and receiving coil 88.

Figure 19:
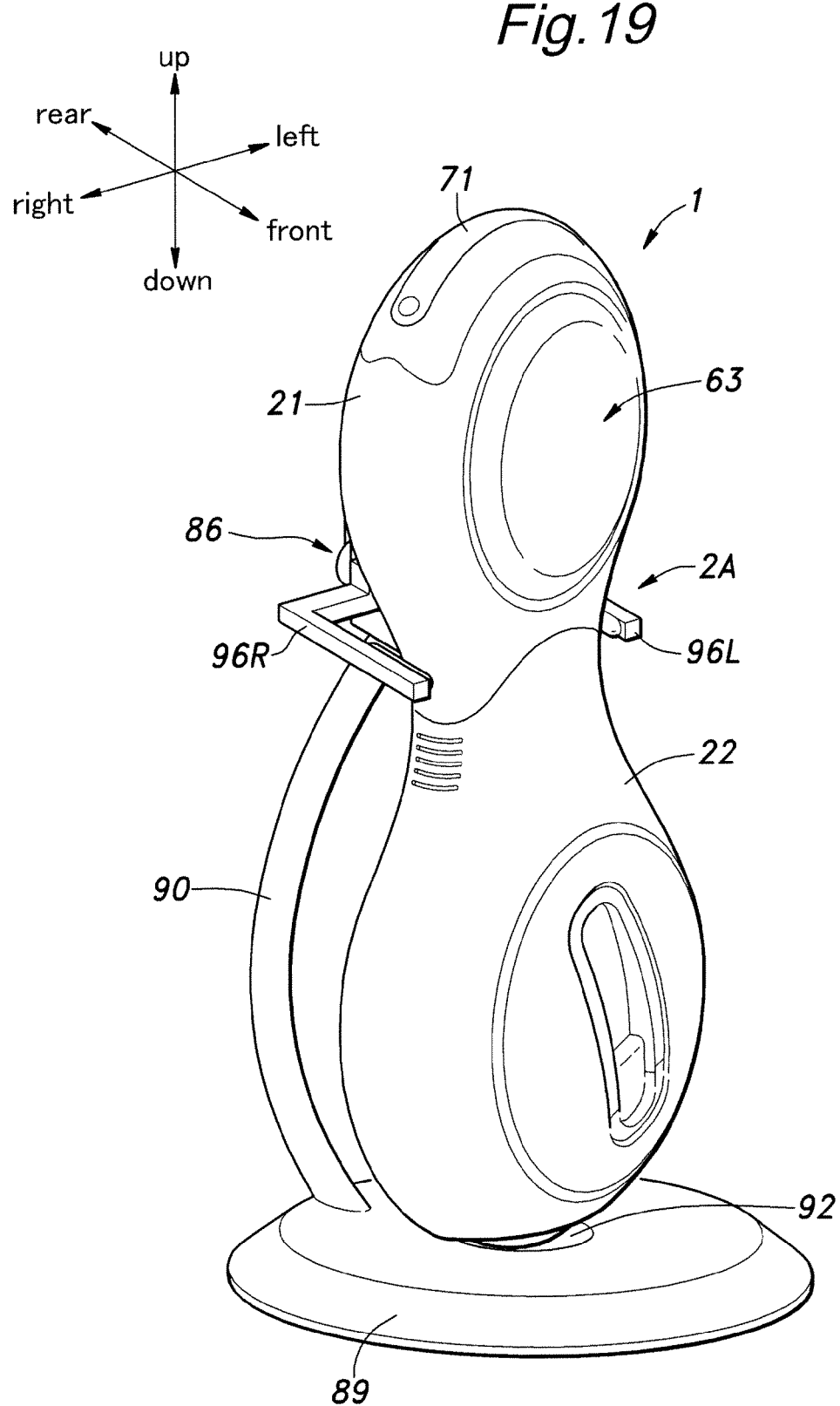
FIG. 19 is a perspective view showing a modified embodiment in which the vehicle is supported by the stand by leaning a lateral side against the stand.

In the foregoing embodiment, the receiving coil 88 was provided in a rear part of the upper frame 21 adjacent to the lower opening 25 thereof. However, the receiving coil 88 may also be provided in a different part of the vehicle 1. For instance, in the modified embodiment illustrated in FIG. 19, the receiving coil 88 is placed on one side, for instance on the right hand side of the upper frame 21 adjacent to the lower opening 25. In such a case, as illustrated in FIG. 19, the vehicle 1 may be placed so as to lean against the front wall 103 of the casing 93 of the stand 86 at one side thereof. The arm members 96 in this case interpose the narrow section 2A of the frame 2 from the front and rear side thereof In this case, the space available for placing the receiving coil 88 can be enlarged, and a relatively large receiving coil 88 may be used. In the description of the modified embodiment, the parts corresponding to the first embodiment are denoted with like numerals without repeating the description of such parts.

Figure 20:
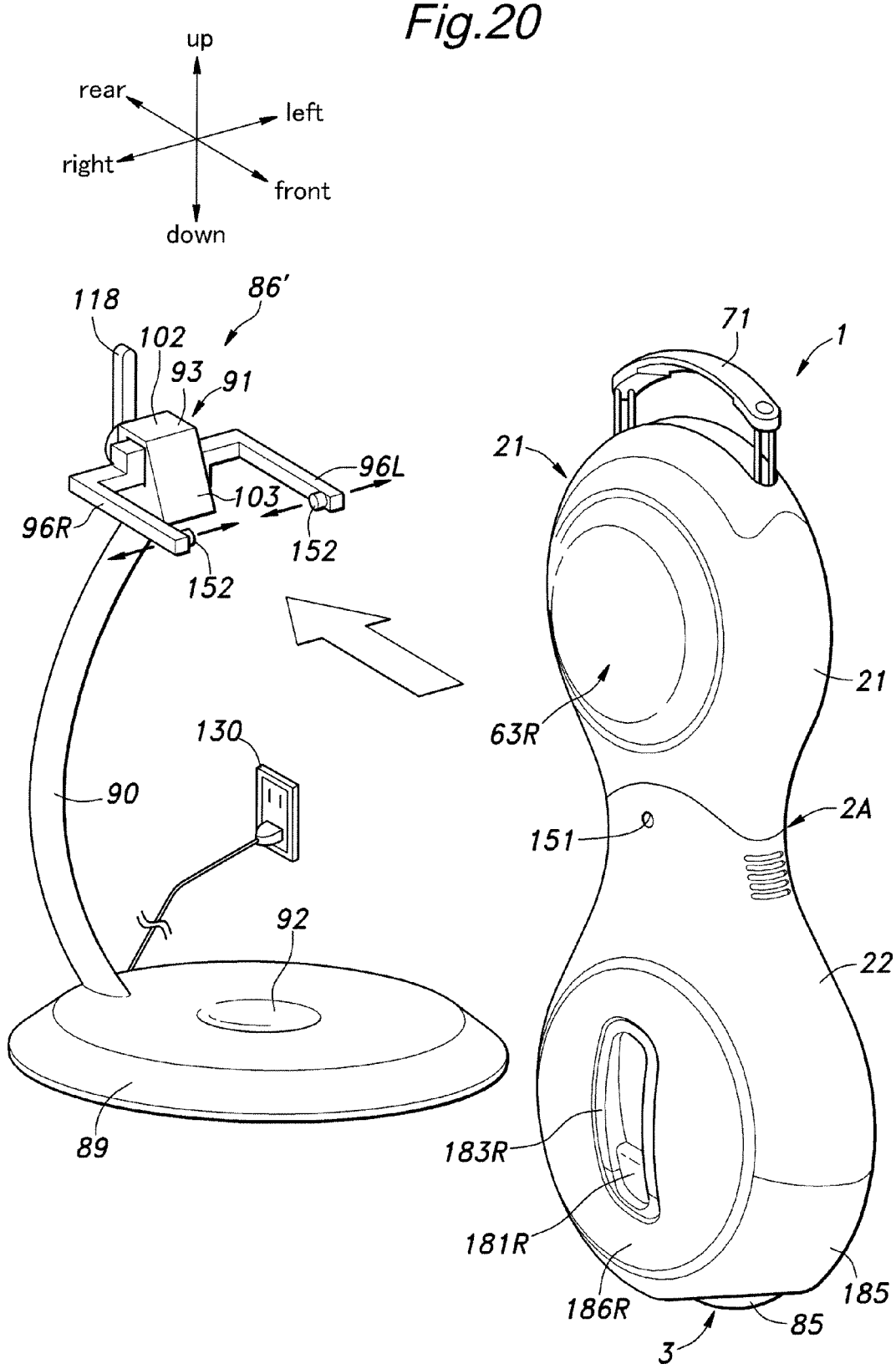
FIG. 20 is a perspective view of an alternate embodiment in which the vehicle is held between a pair of moveable arm members of the stand.

FIG. 20 shows a second embodiment of the present invention. In the description of the second embodiment, the parts corresponding to the first embodiment are denoted with like numerals without repeating the description of such parts. In the recharging system 87 of the second embodiment, the electric current for recharging the onboard battery 281 is supplied from the stand 86' to the vehicle 1 via a connector 151 provided on the vehicle and a corresponding connector 152 provided on the stand 86'.

The vehicle-side connector 151 includes a pair of contacts provided in an upper part of the lower frame 22 on either side wall thereof. The stand-side connector 152 includes a pair of contacts provided on the opposing sides of the free ends of the respective arm members 96. These two sets of contacts are suitably configured to come into close contact with each other when the vehicle 1 is supported by the stand 86' and the arm members 96 are moved toward each other.

When the vehicle 1 is desired to be charged, the road contact area of the main wheel 85 is received in the recess 92, and the rear side of the upper frame 21 is leaned against the front wall 103 of the casing 93. Then, the lever arm 118 is turned in an appropriate direction to cause the two arm members 96 to move toward each other. This causes the contacts of the stand-side connector 152 to come into engagement with the corresponding contacts of the vehicle-side connector 151. Thereby, the electric contact between the vehicle-side connector 151 and stand-side connector 152 can be established. In other words, in the second embodiment, the holding of the vehicle 1 between the arm members 96 and the electric connection between the vehicle-side connector 151 and stand-side connector 152 can be simultaneously effected by the turning of the lever arm 118.

Figure 21:
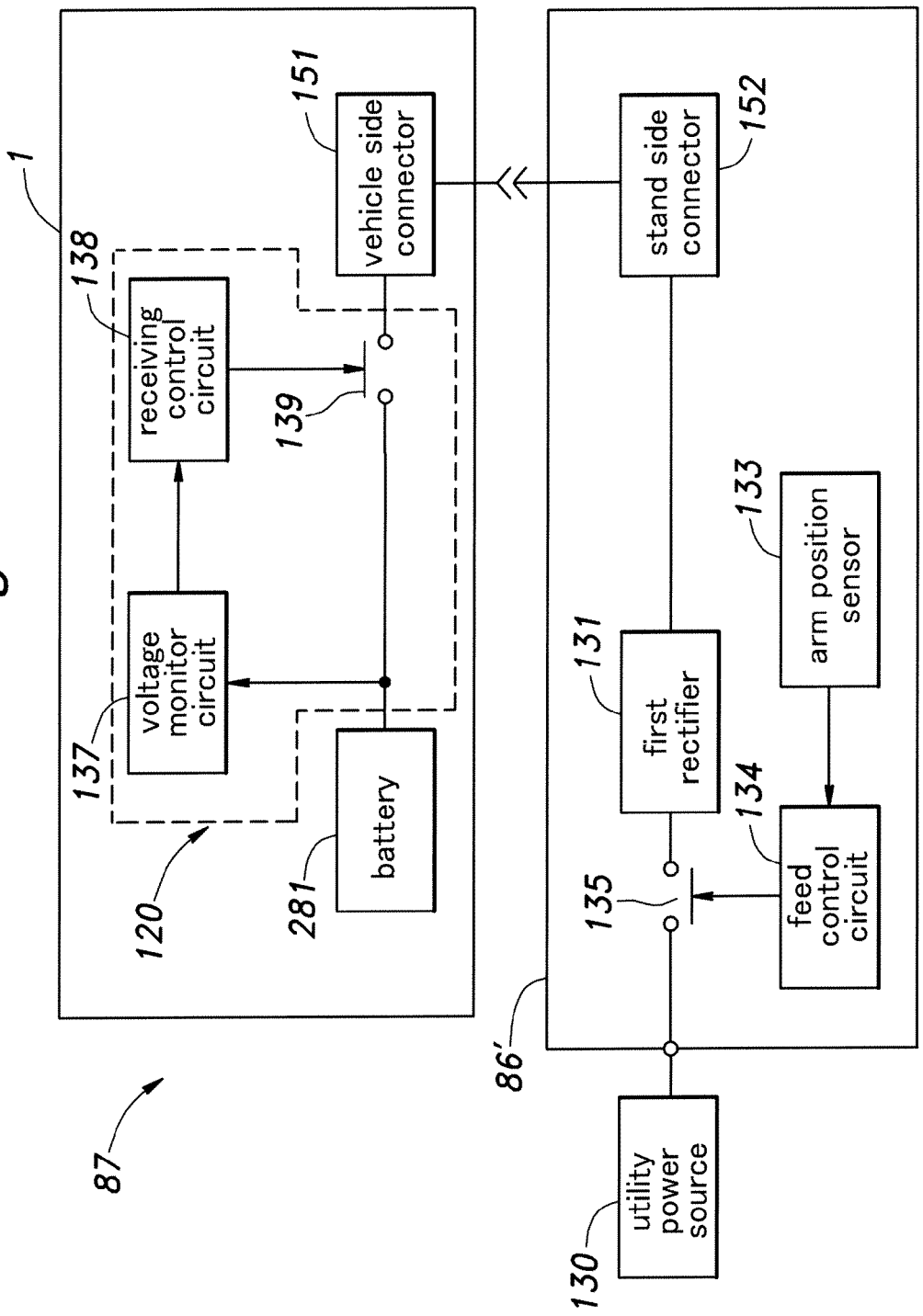
FIG. 21 is a block diagram of an alternate embodiment of the recharging system.

In the second embodiment, because the feed coil 95 and receiving coil 88 are replaced by the vehicle-side connector 151 and stand-side connector 152, the need for the first and second rectifiers 131 and 136 and oscillator circuit 132 is eliminated as illustrated in FIG. 21. Also, the structure of the stand 86 and 86' is not limited by the illustrated embodiments. For instance, the stand 86, 86' may not be integrally provided with the base 89, and the base may be formed as a part of the floor of a building such as the parking space for the vehicle 1. The pillar 90 may not be supported by a special base, but may extend from the wall or floor of a building. The arm members 96 may also be actuated by using a power source such as an electric motor, instead of using a manual effort. If desired, the arm members 96 may be formed as immobile components that define a space configured to snugly receive a suitable part of the frame 2 of the vehicle 1.

Figure 22:
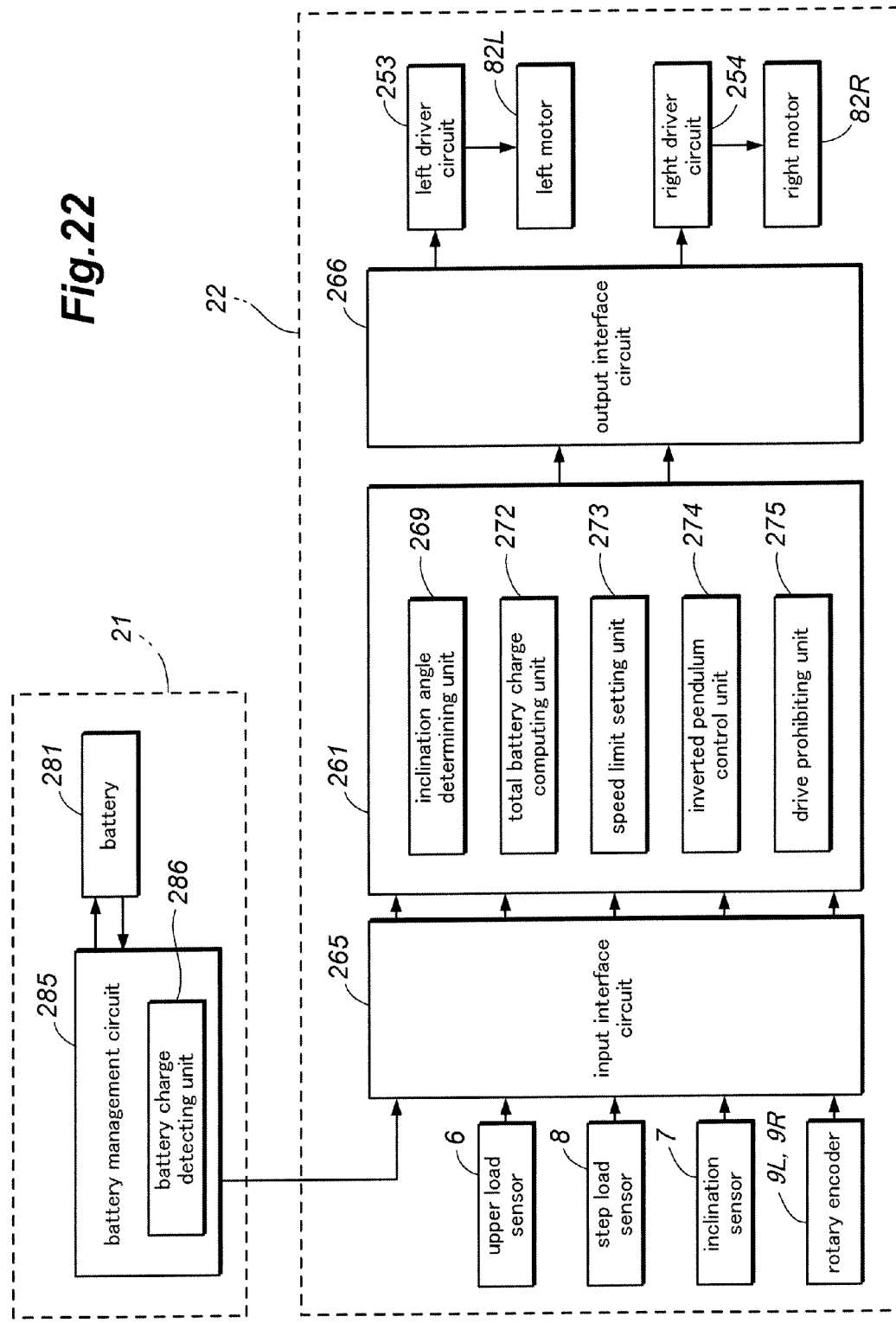
FIG. 22 is a block diagram of an alternate embodiment of the control system.
Figure 23:
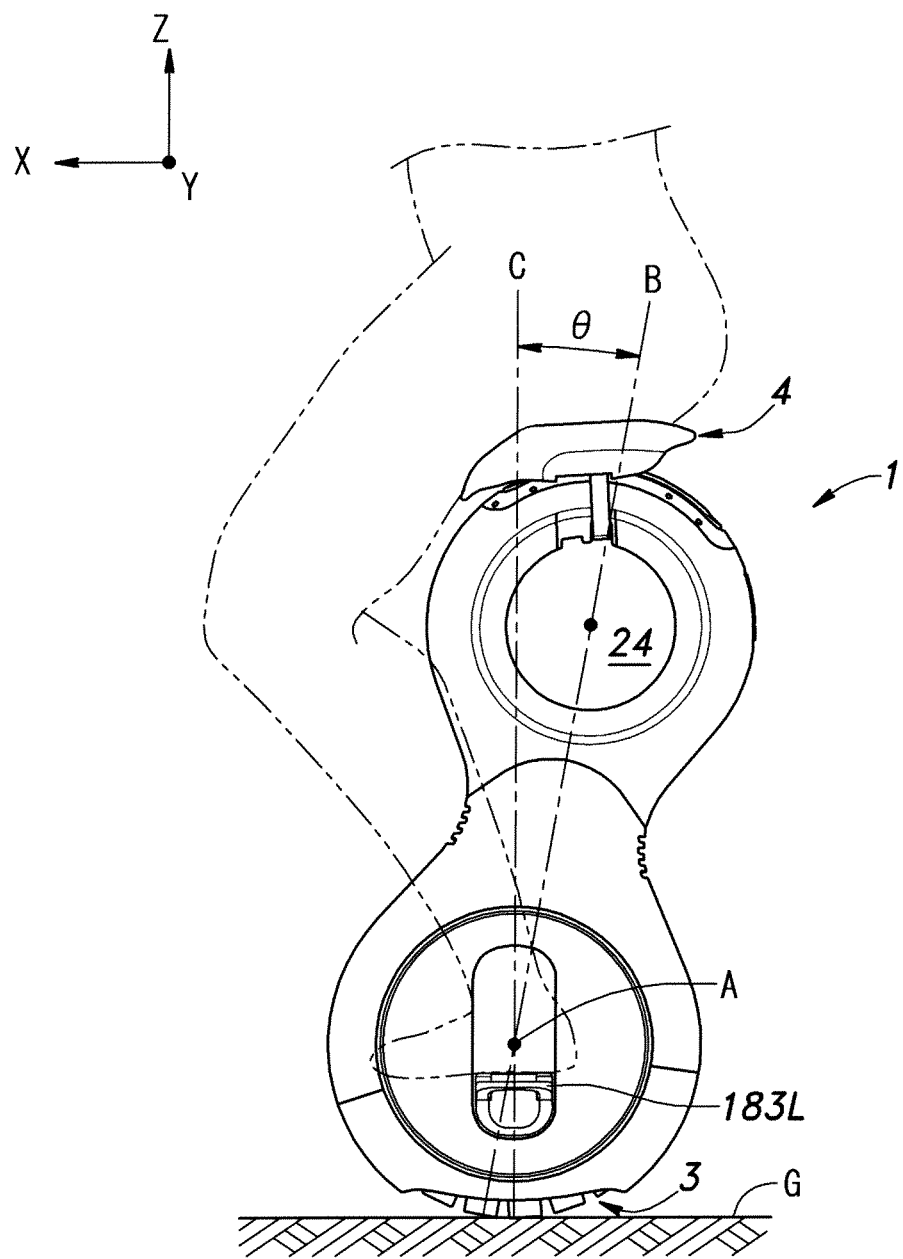
FIG. 23 is a diagram for illustrating the inverted pendulum control.
Figure 24:
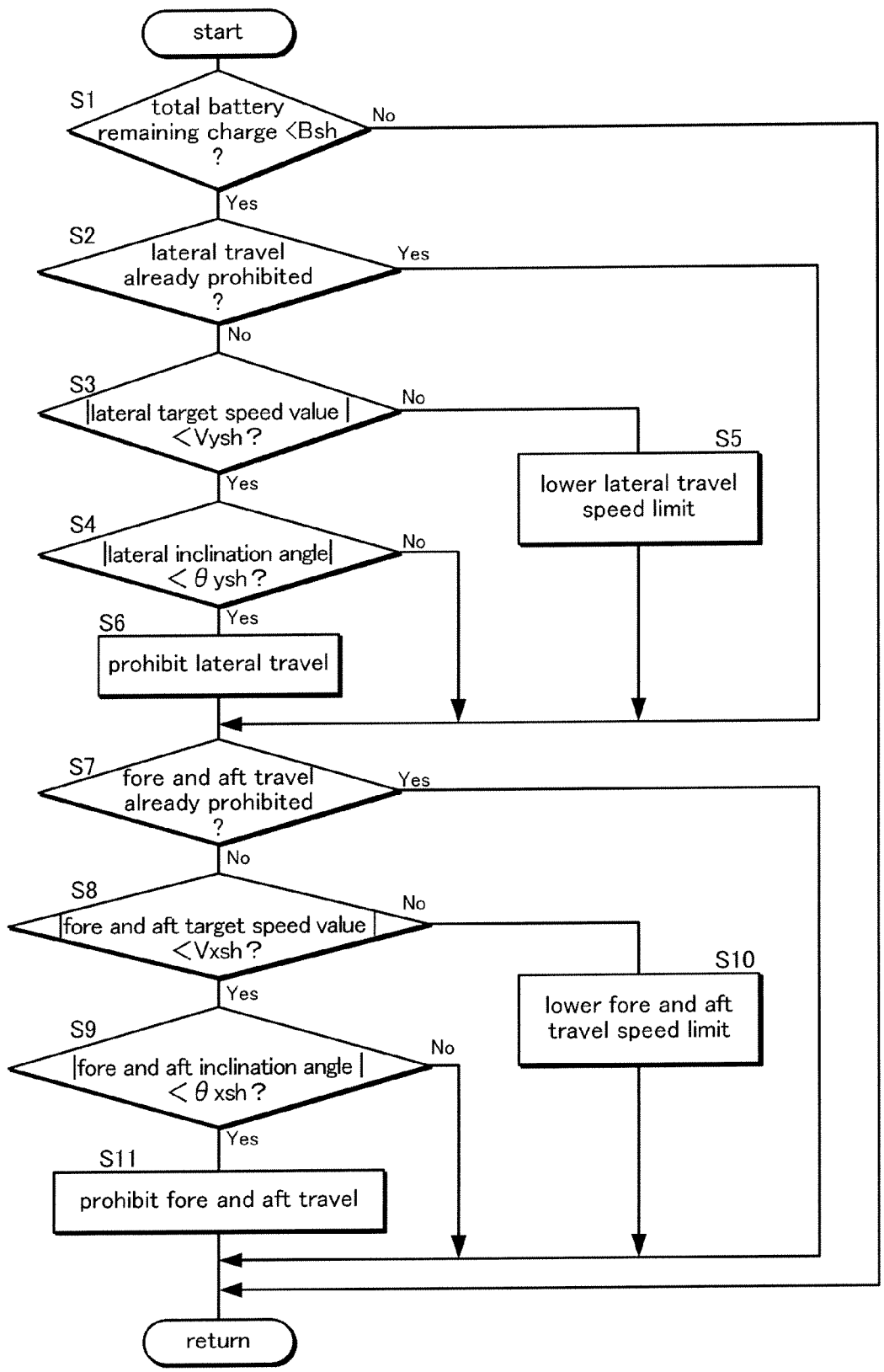
FIG. 24 is a flowchart showing the control process of prohibiting the travel of the vehicle when the remaining charge of the battery has fallen below a threshold level.

FIGS. 22 to 24 show a third embodiment of the present invention which differs from the first embodiment primarily in the structure of the control arrangement, and part of the control process. In the description of the third embodiment, the parts corresponding to those of the first embodiment are denoted with like numerals without repeating the description of such parts.

As shown in FIG. 22, the battery management circuit 285 further comprises a battery charge detecting unit 286 for detecting the remaining charge of the battery 281 according to the output voltage of the battery 281.

The control circuit 261 includes, in addition to the inclination angle determining unit 269, a total battery charge computing unit 272, a speed limit setting unit 273, an inverted pendulum control unit 274 and a drive prohibiting unit 275.

The inclination angle determining unit 269 computes an inclination angle θ of the axial line B connecting the rotational center of the main wheel 85 and the gravitational center of the vehicle 1 including the vehicle occupant D with respect to a vertical (plumb) line C according to the signal from the inclination sensor 7 by using an inclination angle determining unit 269 configured to execute a prescribed computing process. As shown in FIG. 23, the axial line B passes through the rotational center line A of the drive unit 3 and the center of the saddle storage space 24 in side view, and centrally through the vehicle in front view. In the xyz rectilinear coordinate system having an x-axis extending in the fore and aft direction (positive in the forward direction and negative in the rearward direction), a y-axis extending in the lateral direction (positive in the rightward direction and negative in the leftward direction) and a z-axis extending in the vertical direction (positive in the upward direction and negative in the downward direction), the inclination angle θ may have an x-component θx or an inclination angle in the x-axis direction (fore and aft inclination angle), and a y-component θy or an inclination angle in the y-axis direction (lateral inclination angle). The inclination angle determining unit 269 is further configured to compute an inclination angular speed ω by differentiating the inclination angle θ with time. The inclination angular speed ω may have an x-component ωx or an inclination angular speed in the x-axis direction, and a y-component ωy or an inclination angular speed in the y-axis direction.

The total battery charge computing unit 272 computes a total battery remaining charge Bt (%) according to the signals received from the battery management circuit 285.

The speed limit setting unit 273 determines a speed limit base value V1_b (km/h) according to the total battery remaining charge Bt (%) computed by the total battery charge computing unit 272 by looking up a prescribed map. The speed limit base value V1_b may consist of a fore and aft or x-direction speed limit base value V1x_b and a lateral or y-direction speed limit base value V1y_b. In the illustrated embodiment, the map is designed such that the absolute value of the speed limit value V1 is substantially in proportion to the total remaining battery charge Bt when the total remaining battery charge Bt is in the range of 0 to 5%. When the total remaining battery charge Bt is greater than 5%, the speed limit value V1 may be selected arbitrarily.

The speed limit setting unit 273 computes the elapsed time from the time when the total remaining battery charge Bt fell below 5%, and sets up a correction value corresponding to the elapsed time. In the illustrated embodiment, the correction value continuously increases with the increase in the elapsed time. The correction value may be selected, for instance, such that the absolute values of the fore and aft speed limit base value V1x_b and lateral speed limit base value V1y_b each decrease by 1 (km/h) for each second of the elapsed time. The speed limit setting unit 273 computes the fore and aft speed limit value V1x and lateral speed limit value V1y by subtracting the corresponding correction values from the fore and aft speed limit base value V1x_b and lateral speed limit base value V1y_b, respectively. Thus, the greater the elapsed time from the time when the total battery remaining charge Bt (%) fell below 5%, the smaller the speed limit value V1 becomes.

The inverted pendulum control unit 274 computes a target speed base value Vobj_b from the fore and aft inclination angle θx, lateral inclination angle θy, fore and aft inclination angular speed ωx and lateral inclination angular speed ωy by performing a prescribed computing process. The target speed base value Vobj_b may consist of a fore and aft (x-axis) target speed base value Vobjx_b and a lateral (y-axis) target speed base value Vobjy_b. The inverted pendulum control unit 274 compares the computed fore and aft (x-axis) target speed base value Vobjx_b and a lateral (y-axis) target speed base value Vobjy_b with the fore and aft speed limit value V1x and lateral speed limit value V1y set by the speed limit setting unit 273, respectively, and the absolute values of the smaller of each compared pair of values are set as the fore and aft (x-axis) target speed value Vobjx or lateral (y-axis) target speed value Vobjy, as the case may be.

The inverted pendulum control unit 274 sets the fore and aft (x-axis) target speed value Vobjx to zero upon receiving a fore and aft travel prohibiting command from the drive prohibiting unit 275 and lateral (y-axis) target speed value Vobjy to zero upon receiving a lateral travel prohibiting command from the drive prohibiting unit 275 as will be described hereinafter.

The drive prohibiting unit 275 generates a fore and aft (x-axis) travel prohibiting signal and a lateral (y-axis) travel prohibiting signal according to the total battery remaining charge Bt computed by the total battery charge computing unit 272, the fore and aft inclination angle θx and a lateral inclination angle θy computed by the inclination angle determining unit 269, and the fore and aft (x-axis) target speed value Vobjx and lateral (y-axis) target speed value Vobjy computed by the inverted pendulum control unit 274. In the illustrated embodiment, when the total battery remaining charge Bt is less than a prescribed threshold value Bsh (5%, for instance), the fore and aft (x-axis) target speed value Vobjx is less than a prescribed threshold value Vxsh (0.5 km/h, for instance) and the fore and aft inclination angle θx is less than a prescribed threshold value θxsh (5 degrees, for instance), the fore and aft (x-axis) travel prohibiting signal is generated. When the total battery remaining charge Bt is less than a prescribed threshold value Bsh (5%, for instance), the lateral (y-axis) target speed value Vobjy is less than a prescribed threshold value Vysh (0.5 km/h, for instance) and the lateral inclination angle θy is less than a prescribed threshold value θysh (5 degrees, for instance), the lateral (y-axis) travel prohibiting signal is generated.

The process of stopping the operation of the vehicle 1 by the control circuit 261 when the total battery remaining charge Bt has fallen low is described in the following with reference to the flowchart in FIG. 24. This control process is executed at a regular interval of 10 ms. Initially, the drive prohibiting unit 275 determines if the total battery remaining charge Bt is less than a prescribed threshold value Bsh (5% in the illustrated embodiment) (step S1). If the total battery remaining charge Bt is greater than the prescribed threshold value Bsh (or the determination result of step S1 is No), the program flow simply returns to the main control process (which may include any other control processes of the vehicle 1). If the total battery remaining charge Bt is less than the prescribed threshold value Bsh (or the determination result of step S1 is Yes), the program flow advances to step S2.

The steps S2 to S6 are directed to the prohibiting of the lateral travel of the vehicle 1. In step S2, it is determined if the drive prohibiting unit 275 has already prohibited the lateral travel of the vehicle (during the previous control cycle). If the determination result of step S2 is Yes, the program flow advances to step S7. If the determination result of step S2 is No, the program flow advances to step S3.

In step S3, the drive prohibiting unit 275 determines if the absolute value of the lateral (y-axis) target speed value Vobjy is less than a prescribed threshold value Vysh (0.5 km/h in the illustrated embodiment). In other words, it is determined if the target speed of the lateral travel is so small the vehicle is substantially stationary in the lateral direction. If the determination result of step S3 is Yes, the program flow advances to step S4. If the determination result of step S3 is No, the speed limit setting unit 273 reduces the lateral speed limit value by a correction value that depends on the elapsed time in step S5 before the program flow advances to step S7.

In step S4, the drive prohibiting unit 275 determines if the absolute value of the lateral inclination angle θy is less than a prescribed threshold value θysh (5 degrees in the illustrated embodiment). In other words, it is determined if the lateral inclination angle θy is so small that the vehicle 1 may be considered to be in an upright posture in the lateral direction and may be therefore considered to be in a stable posture. If the determination result of step S4 is Yes, the program flow advances to step S6. If the determination result of step S4 is No, the program flow advances to step S7. In step S6, the drive prohibiting unit 275 generates a lateral travel prohibit signal, and forwards it to the inverted pendulum control unit 274 which in turn sets the lateral (y-axis) target speed value Vobjy to zero. Thereby, the lateral travel of the vehicle 1 is prohibited. As a result of the foregoing steps S2 to S6, the vehicle 1 is held stationary with respect to the lateral direction, and maintains a stable posture with a small lateral inclination angle.

In steps S7 to S22, the fore and aft travel of the vehicle 1 is prohibited. In step S7, it is determined if the drive prohibiting unit 275 has already prohibited the fore and aft travel of the vehicle (during the previous control cycle). If the determination result of step S7 is Yes, the program flow returns to the main control flow. If the determination result of step S7 is No, the program flow advances to step S8.

In step S8, the drive prohibiting unit 275 determines if the absolute value of the fore and aft (x-axis) target speed value Vobjx is less than a prescribed threshold value Vxsh (0.5 km/h in the illustrated embodiment). In other words, it is determined if the target speed of the fore and aft travel is so small the vehicle is substantially stationary in the fore and aft direction. If the determination result of step S8 is Yes, the program flow advances to step S9. If the determination result of step S8 is No, the speed limit setting unit 273 reduces the fore and aft speed limit value by a correction value that depends on the elapsed time in step S10 before the program flow returns to the main control flow.

In step S9, the drive prohibiting unit 275 determines if the absolute value of the fore and aft inclination angle θx is less than a prescribed threshold value θxsh (5 degrees in the illustrated embodiment). In other words, it is determined if the fore and aft inclination angle θx is so small that the vehicle 1 may be considered to be in an upright posture in the fore and aft direction and may be therefore considered to be in a stable posture. If the determination result of step S9 is Yes, the program flow advances to step S11. If the determination result of step S9 is No, the program flow returns to the main flow. In step S11, the drive prohibiting unit 275 generates a fore and aft travel prohibit signal, and forwards it to the inverted pendulum control unit 274 which in turn sets the fore and aft (x-axis) target speed value Vobjx to zero. Thereby, the fore and aft travel of the vehicle 1 is prohibited. As a result of the foregoing steps S7 to S11, the vehicle 1 is held stationary with respect to the fore and aft direction, and maintains a stable posture with a small fore and aft inclination angle.

In the vehicle 1 described above, because the speeds of the lateral and fore and aft travel of the vehicle are restricted depending on the total battery remaining charge Bt, the vehicle operator is notified of the lack of the remaining charge of the battery 281 from the behavior of the vehicle 1. Therefore, the vehicle operator is allowed to get off the vehicle and take necessary measures such as supporting the vehicle or otherwise preventing the vehicle from falling down before the vehicle becomes unable to stand by itself owing to the depletion of the battery 281. Furthermore, because the vehicle is held stationary in an upright posture immediately before the vehicle 1 totally loses a power supply thereto, the vehicle operator is enabled to get off the vehicle both easily and safely.

Thus, in the illustrated embodiment, the inverted pendulum type vehicle comprises a frame 2, a drive unit 3 provided in a lower part of the vehicle for enabling the frame to travel on a floor surface in any desired direction, an inverted pendulum control unit 5 for controlling the drive unit according to an inverted pendulum control, a battery 281 for powering the drive unit and a total battery charge computing unit 272 for detecting the remaining charge of the battery, wherein the inverted pendulum control unit 5 causes the drive unit 3 to limit the traveling speed of the vehicle according to the amount of the remaining charge of the battery detected by the total battery charge computing unit 272.

Thus, because the vehicle operator is notified of the imminent depletion of the battery by the reduction in the traveling speed of the vehicle, the vehicle operator is allowed to take measures that are required to bring the vehicle to a stop and place the vehicle in an appropriate posture before the battery is fully depleted, and the vehicle becomes unable to maintain an upright posture by itself It is also possible to progressively reduce the traveling speed of the vehicle as the depletion of the battery progresses so that the vehicle operator may be able to estimate the extent of the battery depletion from the traveling speed of the vehicle.

The traveling speed of the vehicle may be reduced to zero when the remaining charge of the battery falls below a threshold value which is greater than zero. Thereby, the vehicle can be brought to a stop in a controlled manner before the battery becomes so depleted that proper control of the vehicle is rendered impossible.

In the illustrated embodiment, the control circuit 261 includes the inclination angle determining unit 269, and prohibits the travel of the vehicle when the total battery remaining charge Bt falls below the threshold value Bsh, the target speed computed by the inverted pendulum control unit 5 for controlling the drive unit 3 is lower than a prescribed threshold value and an angle between a prescribed axial line of the frame and the vertical plumb line is smaller than a prescribed threshold value.

According to this arrangement, because the inverted pendulum type vehicle can be brought to a stop when the vehicle is in an upright posture in a relatively stable manner, the vehicle operator is allowed to get off from the vehicle in a stable manner.

The illustrated embodiment can be modified in a number of different ways. For instance, the dropping of the total battery remaining charge Bt below the threshold value Bsh may be notified to the vehicle operator by blinking the power lamp 42 or lighting up the power lamp 42 in a prescribed color, and/or sounding an alarm or a loudspeaker not shown in the drawings. The threshold values of the total battery remaining charge Bsh, target speeds Vxsh and Vysh, and inclination angles θxsh and θysh given above are only exemplary, and can be modified as required. The inverted pendulum control of the foregoing embodiment was based on the difference between the prescribed axial line B of the vehicle 1 and a vertical plumb line C, but may also be based on the difference between the prescribed axial line B of the vehicle 1 and a reference inclination angle which is slightly offset from the vertical plumb line C.

In the foregoing embodiment, the travel of the vehicle was prohibited when the total battery remaining charge Bt is below the threshold value Bsh, the target speed is lower that a prescribed threshold value, and the inclination angle is greater than a prescribed threshold value. However, the condition that the inclination angle is greater than a prescribed threshold value may be omitted if desired.

Figure 25:
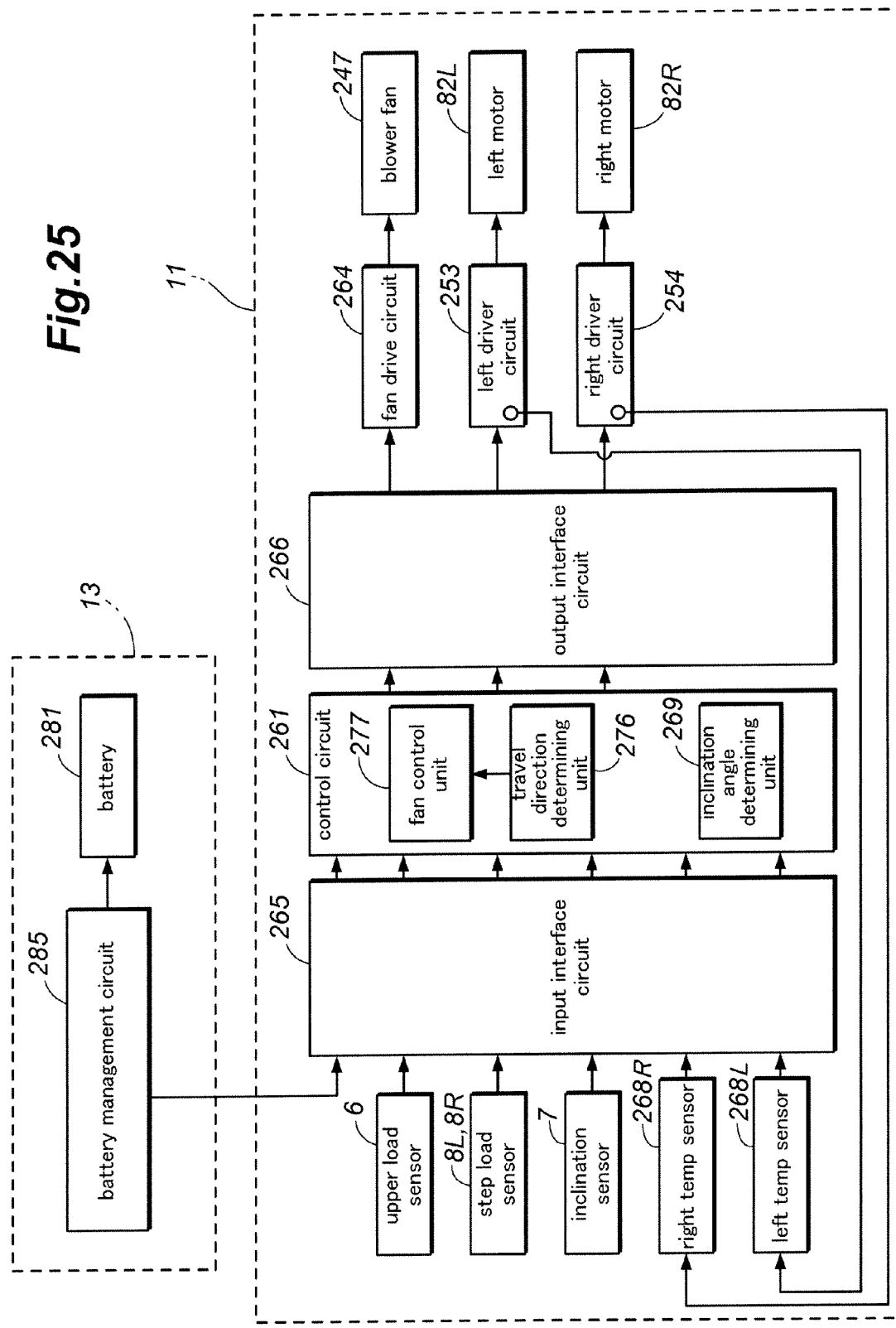
FIG. 25 is a block diagram of a another alternate embodiment of the control system.

FIG. 25 shows a fourth embodiment of the present invention which differs from the previous embodiments in the control of the blower fan 247. This embodiment is otherwise similar to the previously described embodiments, and the parts corresponding to those of the first embodiment are denoted with like numerals in FIG. 25 without repeating the detailed description of such parts.

The electric unit 11 further includes a fan drive circuit 264 that receives a control signal from the control circuit 261 via the output interface circuit 266 for controlling the supply of power to the blower fan 247. Thus, the rotation of the blower fan 247 is controlled by the control circuit 261 and fan drive circuit 264.

Left and right temperature sensors 268L and 268R are provided in suitable parts of the left motor driver circuit board 243 and right motor driver circuit board 244, respectively, that incorporate the left motor driver circuit (inverter circuit) 253 and a right motor driver circuit (inverter circuit) 254, respectively. The detection signals of the left and right temperature sensors 268L and 268R indicating the temperatures of the left motor driver circuit board 243 and right motor driver circuit board 244 are forwarded to the control circuit 261 via the input interface circuit 265.

The control circuit 261 further includes a travel direction determining unit 276 and a fan control unit 277. The travel direction of the vehicle 1 affects the flow rate or speed of air flow into and out of the vent openings 39A and 39B, and the travel direction of the vehicle 1 detected by the travel direction determining unit 276 affects the cooling of the electric unit 11. The fan control unit 272 determines the rotational speed of the blower fan 247 according to the output signals of the left and right temperature sensors 268L and 268R and the output signal of the travel direction determining unit 276.

The travel direction determining unit 276 determines if the vehicle 1 is traveling ahead, stationary in the fore and aft direction (possibly traveling laterally) and traveling rearward, and forwards the detection signal to the fan control unit 277 to indicate which of the three states the vehicle travel is in.

The fan control unit 277 basically controls the rotational speed of the blower fan 247 according to the output signals of the left and right temperature sensors 268L and 268R, but also takes into account the travel direction of the vehicle 1 in determining the rotational speed of the blower fan 247 because the air flow into and out of the vent openings 39A and 39B is affected by the travel direction of the vehicle 1, and the air flow effective in cooling the electric unit 11 can be given as a combination of the air flow caused by the blower fan 247 and that caused by the travel of the vehicle 1. How the travel of the vehicle 1 contributes to the generation of cooling air flow may be experimentally or otherwise determined in advance, and compiled into a map that can be used for determining the rotational speed of the blower fan 247 that is required for keeping the electric unit 11 within a prescribed temperature range.

Figure 26:
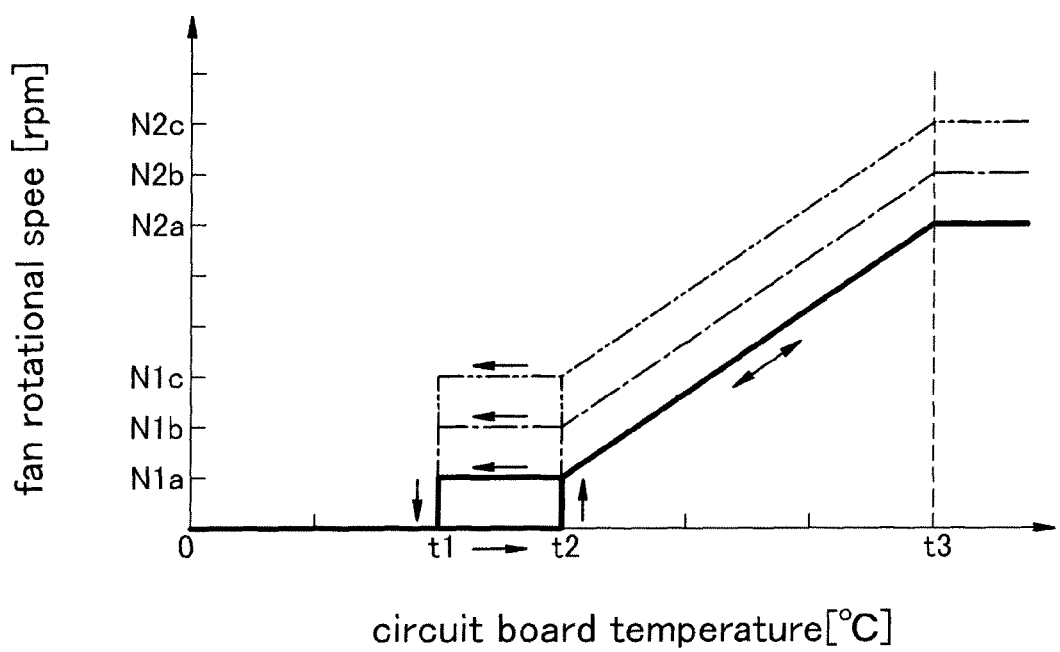
FIG. 26 is a graph showing the relationship between the circuit board temperature and rotational speed of the blower fan in a blower fan control of the present invention.

FIG. 26 shows a mode of control of the rotational speed of the blower fan 247 in relation to the temperature of the circuit boards 243 and 244. The temperature of the circuit boards 243 and 244 may consist of the higher of the temperatures the two circuit boards 243 and 244 or may also consist of an average of the two temperature, for instance. In the graph of FIG. 26, the abscissa indicates the temperature of the circuit board (243, 244), and the ordinate indicates the rotational speed of the blower fan 247. The solid lines represent the case where the vehicle is traveling forward, the chain-dot lines represent the case where the vehicle is stationary or traveling strictly laterally, and the double-dot chain-dot lines represent the case where the vehicle is traveling rearward.

When the vehicle is traveling forward, the air flow caused by the travel of the vehicle is added to the air flow caused by the blower fan 247 so that the rotational speed of the blower fan 247 may be relatively low for the adequate cooling effect to be achieved. When the vehicle is traveling rearward, the air flow caused by the travel of the vehicle is subtracted from the air flow caused by the blower fan 247 so that the rotational speed of the blower fan 247 may have to be relatively high for the adequate cooling effect to be achieved. When the vehicle is stationary or traveling strictly laterally, the rotational speed of the blower fan 247 should be intermediate between these two cases. Based on this recognition, the rotational speed of the blower fan 247 can be controlled to an optimum level so as to achieve a cooling effect without excessively increasing the rotational speed of the blower fan 247. This contributes to the minimization of power consumption by the blower fan 247 (thereby prolonging the life of the battery) and reducing the wear of the blower fan 247 (thereby prolonging the life of the battery blower fan 247).

The estimation of the air flow caused by the travel of the vehicle 1 is more advantageous than using an air flow meter because there is some time delay between the start of the travel of the vehicle 1 and the resultant generation of air flow, and the detection of air flow based on the travel state of the vehicle 1 is faster than the detection of air flow using an air flow meter. Furthermore, the illustrated embodiment has the additional advantage of not requiring any air flow meter.

When the vehicle is traveling forward, air flows into the front vent openings 39A, and flows rearward inside the narrow section 2A of the frame 2 as indicated by an arrow W in FIGS. 8 and 9 before being expelled from the rear vent openings 39B. In this case, the air flow caused by the rotation of the air blower fan 247 is directed in the same direction as indicated by a double-dot chain dot line arrow F1 in FIG. 9. Therefore, when the vehicle 1 is traveling forward, the air flow F1 caused by the air flow fan 247 and the air flow W caused by the forward travel of the vehicle 1 join forces in cooling the circuit boards 243 and 244. A part of the air flow caused by the air flow fan 247 is diverted upward in the space between the control circuit board 241 and I/O interface circuit board 245 as indicated by an arrow F2, and this cools the control circuit board 241 and I/O interface circuit board 245.

When the vehicle 1 is stationary or traveling strictly laterally, there is substantially no air flow that is passed into the front vent openings 39A, and the cooling of the circuit boards 243 and 244 must wholly rely on the air flow caused by the air blower fan 247. When the vehicle 1 is traveling rearward, air flows into the narrow section 2A of the frame 2 from the rear vent openings 39B, and this air flow opposes that caused by the rotation of the air blower fan 247. Therefore, the air blower fan 247 is require to provide an air flow that cancels the air flow caused by the rearward travel of the vehicle in addition to the air flow required to adequately cool the circuit boards 243 and 244.

As shown in FIG. 26, the rotational speed of the air blower fan 247 is based on the detected temperature of the circuit boards 243 and 244. When the temperature rises from a low level, the air blower fan 247 remains inoperative until the temperature reaches a second temperature level t2 beyond which the circuit boards 243 and 244 are required to be cooled. Once the higher of the temperatures of the circuit boards 243 and 244 exceeds the second temperature level t2, the air blower fan 247 is operated at a first rotational speed N1a (N1b, N1c).

In the illustrated embodiment, the first rotational speed is set at N1a if the vehicle 1 is traveling ahead, at N1b if the vehicle is stationary or traveling strictly laterally, and at N1c if the vehicle is traveling rearward (where N1a<N1b<N1c). The first rotational speed is thus selected so as to account for the air flow caused by the travel of the vehicle.

The rotational speed of the air flow fan 247 is increased substantially in proportion to the increase in the temperature of the circuit boards 243 and 244 when the temperature is between the second temperature level t2 and a third temperature level t3 which is higher than the second temperature level t2. When the travel condition of the vehicle 1 changes at any particular moment, the rotational speed of the air blower fan is determined by changing the curve in the graph of FIG. 26 to the corresponding one.

Once the temperature of the circuit boards 243 and 244 increases beyond the third temperature level t3, the rotational speed of the air blower fan 247 is fixed at the prescribed maximum rotational speed N2a, N2b or N2c (where N2a<N2b<N2c) depending on the travel condition of the vehicle 1. This temperature level may be set at a level which is higher than the expected maximum temperature level.

When the temperature decreases from a relatively high level, the rotational speed of the air blower fan 247 remains at the maximum rotational speed N2a, N2b or N2 until the temperature level reaches the third temperature level t3. As the temperature drops further, the rotational speed of the air blower fan 247 is decreased in proportion to the drop in the temperature following the same curve as when the temperature was increased. Once the temperature reaches the second temperature t2, the rotational speed of the air blower fan 247 is fixed at the minimum rotational speed N1a (N1b, N1c) even when the temperature drops even further until the temperature level reaches a first temperature level t1 which is lower than the second temperature level t2. When the temperature level falls below the first temperature level t1, the rotational speed of the air blower fan 247 is set to zero.

By thus providing a hysteresis in the relationship between the detected temperature of the circuit boards 243 and 244 and the rotational speed of the air blower fan 247, the rotational speed of the air blower fan 247 can be favorably controlled without causing frequent activation and deactivation of the air blower fan 247. Therefore, when the vehicle 1 is operating under a low load condition, and is therefore producing relatively low noises, the air blower fan 247 is typically inoperative most of the time so that the air blower fan 247 is prevented from producing noises which could be annoying.

As discussed above, the control unit of the inverted pendulum type vehicle includes various devices, in particular power devices that control the supply of electric power to electric motors, and these devices, in particular when driving the electric motors, generates a substantial amount of heat, and a blower fan is typically used for removing the generated heat. The blower fan inevitably emits noises, and there have been efforts to minimize noises caused by a blower fan. See Japanese patent laid open publication No. 2006-106409 (patent document 3), for instance.

This prior proposal is aimed at reducing the noises of a blower fan after turning off a discharge lamp of a projector. The rotational speed of the blower fan can be changed to any of a plurality of levels, and the duration of the operation of the blower fan is determined from the total amount of air required for the necessary cooling effect. When a silent operation is required, a relatively low rotational speed is selected, and the blow fan is operated for a correspondingly long period of time which is determined by the total amount of air required for the necessary cooling effect.

In the case of this prior invention, the electric components that are required to be cooled by the blower fan are fixed in position, and the direction of the air flow is fixed in space. However, in the case of an inverted pendulum type vehicle, the vehicle is able to travel in both the fore and aft direction and lateral direction. The travel of the vehicle creates an air flow relative to the vehicle, and this air flow can be used for the cooling of power emitting devices of the control unit of the vehicle. However, the air flow caused by the travel of the vehicle varies depending on the mode of travel, and the cooling need also greatly varies depending on the load of the electric motors.

For instance, when the frame of the vehicle is formed with vent openings so that a relatively large amount of air may be drawn into the frame when the vehicle is traveling ahead whereas the cooling effect of the air flow caused by the travel of the vehicle is significantly diminished when the vehicle is stationary or traveling strictly laterally. As the capacity of the blower fan has to be determined so as to be adequate in the worst condition, there are times when the blow fan is operated unnecessarily, and this wastes electric power while causing unnecessary noises.

Thus, it is difficult to make use of the air flow caused by the travel of the vehicle for the cooling of the heat generating components of the vehicle in a rational manner. However, if the cooling of the heat generating components is performed solely by the blower fan without making use of the air flow caused by the travel of the vehicle, the power consumption by the blower fan needlessly increases, and the noises caused by the blower fan may have to be needlessly generated.

Therefore, in the illustrated embodiment, the hollow frame is formed with vent openings for admitting air into the frame, and is incorporated with a blower fan that creates an air flow directed in the same direction as the air flow admitted from the vent openings within the frame when the vehicle is traveling straight ahead. The control circuit 261 includes an admitted air flow detecting unit (travel direction determining unit 276) for detecting the flow speed (or flow rate) of the air admitted from the vent openings, and a fan control unit 277 for controlling the rotational speed of the blower fan 247 according to the flow speed (or flow rate) of the air admitted from the vent openings so as to maintain the flow speed (or flow rate) of the air available for cooling electric components of the electric unit 11 at a fixed level without regard to the travel condition of the vehicle.

By changing the rotational speed of the blower fan depending on the flow speed (or flow rate) of the air admitted from the vent openings or depending on the travel direction of the vehicle so as to increase the rotational speed of the blower fan when the vehicle is not traveling straight ahead, the air available for cooling electric components of the electric unit 11 can be kept substantially constant without regard to the traveling direction of the vehicle. Therefore, the required capacity of the blower fan can be minimized, and this contributes to the compact design of the cooling system.

The admitted air flow detecting unit 271 may be configured to detect the amount of the admitted air flow according to the traveling direction of the vehicle 1. Preferably, the amount of the admitted air flow may be given by a map for different travel conditions of the vehicle. Thereby, the amount of the admitted air flow can be estimated without directly measuring the same, and this provides a more quick response than actually measuring the amount of the admitted air flow.

Temperature sensors 268L and 268R may be provided on electric components 243a and 244a of the electric unit 11, and the fan control unit 272 may control the rotational speed of the blower fan 247 in dependence on the detected temperature. Therefore, the cooling control based on an actually measured temperature can be effected in a favorable manner. When this temperature control is combined with the temperature control based on the travel condition of the vehicle, the rotational speed of the blower fan 247 is controlled without response delay, and can be increased even before a rise in the temperature of the electric components 243a and 244a occurs.

The map for determining the rotational speed of the blower fan may be provided with a hysteresis property so that the frequent changes in the rotational speed of the blower fan may be avoided. This also contributes to the reduction in annoying noises which could be otherwise caused by frequent turning on and off of the blower fan 247.

In the foregoing embodiment, the rotational speed of the blower fan 247 was determined by using the map illustrated in FIG. 26. However, it is also possible to use a mathematical formula for relating the temperature of the circuit boards with the rotational speed of the blower fan 247, and use appropriate correction factors on the mathematical formula to account for the change in the travel condition of the vehicle 1.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of any prior art references mentioned in this application are incorporated in this application by reference.

The invention claimed is:

1. A recharging system for a rechargeable battery of an inverted pendulum vehicle, comprising:
   a stand for holding the inverted pendulum vehicle in a substantially upright posture by using a supporting member that engages a prescribed part of the inverted pendulum vehicle; and
   a power feed device provided on the stand and connected to a power source; wherein
   the power feed device is configured to electrically couple with a power take device provided on the inverted pendulum vehicle to feed electric power from the power source to the rechargeable battery;
   the power feed device is positioned so as to provide receive electric power to the power take device when the inverted pendulum vehicle is put into a prescribed positional relationship to the supporting member of the stand; and
   the supporting member comprises a front wall configured for leaning a narrow section of the inverted pendulum vehicle against thereto, the narrow section being in a vertically intermediate part of the inverted pendulum vehicle, and the narrow section being narrowed in the fore and aft direction.

2. The recharging system according to claim 1, wherein the supporting member comprises a pair of arm members configured to interpose the narrow section therebetween.

3. The recharging system according to claim 2, wherein the inverted pendulum vehicle is generally longer in the fore and aft direction than in a lateral direction.

4. The recharging system according to claim 3, wherein the front wall is configured for leaning a fore and aft end of the narrow section against thereto while the arm members interpose the narrow section from either lateral side of the inverted pendulum vehicle there between.

5. The recharging system according to claim 3, wherein the front wall is configured for leaning a lateral side of the narrow section against thereto while the arm members interpose the narrow section from either fore and aft end of the inverted pendulum vehicle there between.

6. The recharging system according to claim 2, wherein the stand comprises a mechanism for selectively moving the arm members toward and away from each other.

7. The recharging system according to claim 1, wherein the power feed device comprises a primary coil for generating a AC magnetic field, and the power take device comprises a secondary coil for inducing AC electric current from the generated AC magnetic field when the prescribed part of the inverted pendulum vehicle is engaged by the supporting member of the stand.

8. The recharging system according to claim 1, wherein the power feed device comprises a first electric connector, and the power take device comprises a second electric connector which is configured to establish an electric connection with the first electric connector when the prescribed part of the inverted pendulum vehicle is engaged by the supporting member of the stand.

9. The recharging system according to claim 8, wherein the first electric connector is provided at least on one of the arm members.

10. The recharging system according to claim 2, wherein the inverted pendulum vehicle comprises a frame including an upper frame and a lower frame that are separated from each other by the narrow section, and the upper frame defines a hollow interior receiving the rechargeable battery therein while the lower frame is incorporated with a drive unit that is powered by the rechargeable battery and propels the inverted pendulum vehicle.

11. The recharging system according to claim 10, wherein the narrow section defines a hollow interior receiving an electric unit for controlling supply of electric power from the rechargeable battery to the drive unit.

* * * * *